(12) United States Patent
Nishikawa et al.

(10) Patent No.: US 10,776,627 B2
(45) Date of Patent: Sep. 15, 2020

(54) HUMAN FLOW ANALYSIS METHOD, HUMAN FLOW ANALYSIS APPARATUS, AND HUMAN FLOW ANALYSIS SYSTEM

(71) Applicant: Panasonic Corporation, Osaka (JP)

(72) Inventors: Yuri Nishikawa, Kanagawa (JP); Jun Ozawa, Nara (JP)

(73) Assignee: PANASONIC CORPORATION, Osaka (JP)

( * ) Notice: Subject to any disclaimer, the term of this patent is extended or adjusted under 35 U.S.C. 154(b) by 142 days.

(21) Appl. No.: 16/026,113

(22) Filed: Jul. 3, 2018

(65) Prior Publication Data

US 2019/0026560 A1 Jan. 24, 2019

(30) Foreign Application Priority Data

Jul. 18, 2017 (JP) .................................. 2017-138854

(51) Int. Cl.
*G06T 7/246* (2017.01)
*G06K 9/00* (2006.01)
(Continued)

(52) U.S. Cl.
CPC ..... *G06K 9/00677* (2013.01); *G06K 9/00302* (2013.01); *G06K 9/00778* (2013.01);
(Continued)

(58) Field of Classification Search
CPC combination set(s) only.
See application file for complete search history.

(56) References Cited

U.S. PATENT DOCUMENTS

| 5,973,732 A * | 10/1999 | Guthrie | G06K 9/00778 348/150 |
|---|---|---|---|
| 2003/0107649 A1 * | 6/2003 | Flickner | G06K 9/00778 348/150 |

(Continued)

FOREIGN PATENT DOCUMENTS

| JP | 2007-041964 | 2/2007 |
|---|---|---|
| JP | 2011-070275 | 4/2011 |

(Continued)

OTHER PUBLICATIONS

Martin Wollmer, "LSTM-Modeling of Continuous Emotions in an Audiovisual Affect Recognition Framework", Apr. 13, 2012, Image and Vision Computing , pp. 1-17.*

*Primary Examiner* — Omar S Ismail
(74) *Attorney, Agent, or Firm* — Greenblum & Bernstein, P.L.C.

(57) ABSTRACT

A human flow analysis apparatus includes a movement information acquirer that acquires movement information, the movement information representing a history of movement within a predetermined space by multiple persons moving within the predetermined space, an associated-nodes extractor that, based on the movement information, extracts at least two persons assumed to be moving in association with each other, an association information identifier that identifies association information, the association information indicating what association the extracted at least two persons have with each other, a node fusion determiner that, based on the identified association information, determines whether to group the at least two persons together, and a behavior predictor that predicts a behavior of the at least two persons who have been determined to be grouped together.

20 Claims, 21 Drawing Sheets

(51) Int. Cl.
  *G06T 7/70*   (2017.01)
  *G10L 15/26*  (2006.01)

(52) U.S. Cl.
  CPC ............. *G06T 7/246* (2017.01); *G06T 7/70* (2017.01); *G06K 9/00597* (2013.01); *G06T 2207/10016* (2013.01); *G06T 2207/10024* (2013.01); *G06T 2207/30196* (2013.01); *G06T 2207/30241* (2013.01); *G10L 15/265* (2013.01)

(56) References Cited

U.S. PATENT DOCUMENTS

| | | | | |
|---|---|---|---|---|
| 2005/0256813 A1* | 11/2005 | Bahbouh | | G06N 7/02 706/1 |
| 2006/0018516 A1* | 1/2006 | Masoud | | G06T 7/254 382/115 |
| 2008/0147488 A1* | 6/2008 | Tunick | | G06Q 30/0273 705/7.29 |
| 2009/0138415 A1* | 5/2009 | Lancaster | | G06N 5/04 706/11 |
| 2010/0228432 A1* | 9/2010 | Smith | | G01L 5/0052 702/113 |
| 2011/0279685 A1* | 11/2011 | Alahi | | H04N 5/247 348/187 |
| 2012/0221231 A1* | 8/2012 | Nagata | | G06Q 10/047 701/118 |
| 2012/0328633 A1* | 12/2012 | Yamashita | | C07K 16/18 424/173.1 |
| 2017/0132475 A1* | 5/2017 | Oami | | G06M 11/00 |
| 2017/0289526 A1* | 10/2017 | Sasatani | | G06K 9/4604 |
| 2018/0349710 A1* | 12/2018 | Houri | | G06K 9/00664 |
| 2019/0102630 A1* | 4/2019 | Bamba | | G06T 7/248 |
| 2020/0050873 A1* | 2/2020 | Ikeda | | H04W 4/029 |

FOREIGN PATENT DOCUMENTS

| | | |
|---|---|---|
| JP | 2012-155274 | 8/2012 |
| JP | 2016-035665 | 3/2016 |

\* cited by examiner

FIG. 2

| TIME | NODE ID | COORDINATE POSITION |
|---|---|---|
| 15:05 | ABX123 | (215, 341, 3) |
| 15:05 | ABX125 | (215, 341, 3) |
| 15:07 | ABX123 | (218, 345, 3) |
| 15:07 | ABX125 | (218, 345, 3) |

FIG. 4

| MAJOR CATEGORY | MINOR CATEGORY |
|---|---|
| FAMILY | FATHER- AND MOTHER-INFANT GROUP |
|  | FATHER- AND MOTHER-TODDLER GROUP |
|  | MOTHER-GRADE SCHOOLER GROUP |
|  | ... |
| FRIENDS | 10'S FEMALE FRIEND GROUP |
|  | 20'S MALE FRIEND GROUP |
|  | ... |
| COUPLE | 10'S MALE-FEMALE PAIR |
|  | 20'S MALE-FEMALE PAIR |
|  | ... |

FIG. 5

| FUSION NODE ID | NODE ID | MAJOR CATEGORY | MINOR CATEGORY |
|---|---|---|---|
| XYZ111 | ABX123, ABX125 | FAMILY | MOTHER-TODDLER GROUP |
| XYZ112 | ABX131, ABX133 | FRIENDS | 10'S FEMALE FRIEND GROUP |
| XYZ113 | ABX141, ABX142 ABX145 | FAMILY | FATHER- AND MOTHER-TODDLER GROUP |
| ... | ... | ... | ... |

FIG. 11

NODE NO.

| | 1 | 2 | 3 | 4 | 5 | ·· | 10 |
|---|---|---|---|---|---|---|---|
| 1 | | 20 | 34 | 32 | 23 | ·· | 54 |
| 2 | | | 8 | 23 | 32 | ·· | 32 |
| 3 | | | | 45 | 21 | ·· | 45 |
| 4 | | | | | 45 | ·· | 21 |
| 5 | | | | | | ·· | 23 |
| ·· | | | | | | | 56 |
| 10 | | | | | | | |

NODE NO.

DISTANCES BETWEEN PERSON NODES

HUMAN FLOW ANALYSIS METHOD, HUMAN FLOW ANALYSIS APPARATUS, AND HUMAN FLOW ANALYSIS SYSTEM

BACKGROUND

1. Technical Field

The present disclosure relates to a human flow analysis method, a human flow analysis apparatus, and a human flow analysis system that analyze the flow of multiple persons moving within a predetermined space.

2. Description of the Related Art

In related art, human flow prediction is performed in places where multiple persons are present. The human flow prediction involves predicting, from the movement direction of each of the multiple persons, where each person will move next.

For example, Japanese Unexamined Patent Application Publication No. 2016-035665 discloses an entry/exit gate control system. The disclosed entry/exit gate control system acquires the state of human flow from multiple sensors installed in the vicinity of multiple entry/exit gates, predicts future flow demands for each direction of flow through the entry/exit based on the human flow state, determines the direction of passage through each entry/exit gate based on the predicted flow demands, and sets the direction of passage for each of the entry/exit gates.

SUMMARY

In one general aspect, the techniques disclosed here feature a human flow analysis method for a human flow analysis apparatus. The human flow analysis method includes acquiring movement information, the movement information representing a history of movement within a predetermined space by multiple persons moving within the predetermined space, extracting, based on the acquired movement information, at least two persons assumed to be moving in association with each other, identifying association information, the association information indicating what association the extracted at least two persons have with each other, determining, based on the identified association information, whether to group the at least two persons together, and predicting a behavior of the at least two persons who have been determined to be grouped together.

According to the present disclosure, it is determined whether to group together at least two persons who are assumed to be moving in association with each other, and if the at least two persons are determined to be grouped together, their behavior is predicted. This makes it possible to predict the line of movement of each person with improved accuracy.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 illustrates exemplary movement information according to Embodiment 1;

FIG. 4 illustrates exemplary labels given to fusion nodes according to Embodiment 1;

FIG. 5 illustrates exemplary fusion node information according to Embodiment 1;

FIG. 11 illustrates distances between individual person nodes;

DETAILED DESCRIPTION

Figure 1:
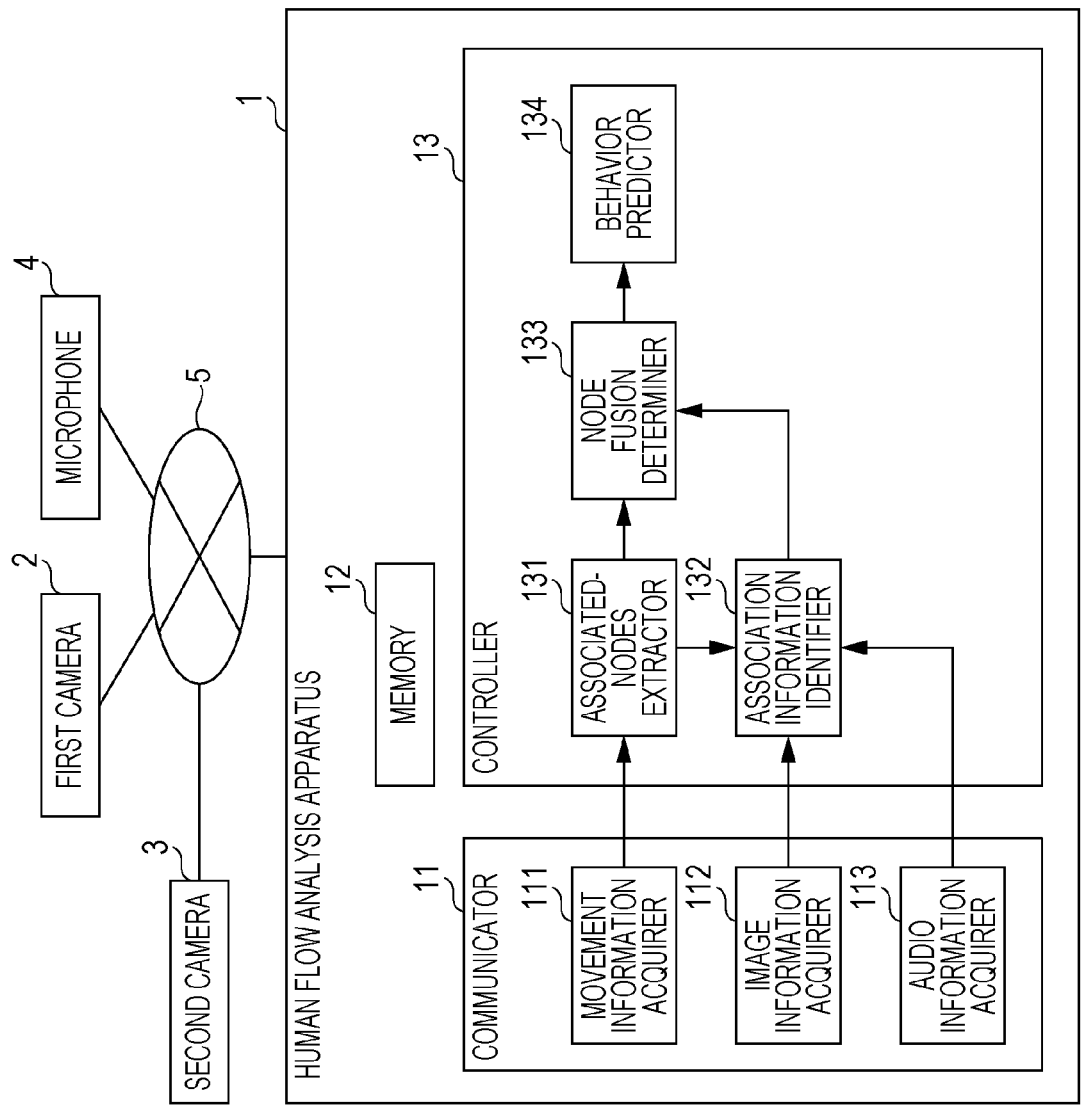
FIG. 1 illustrates the configuration of a human flow analysis system according to Embodiment 1 of present disclosure.

Underlying Knowledge Forming Basis of the Present Disclosure

As described above, with the technique disclosed in Japanese Unexamined Patent Application Publication No. 2016-035665, for example, data collected by a camera is used to calculate the current state of human flow or a prediction for future flow state. The term flow state in this case includes, for example, information such as the number of persons present in a specific place, the location of each of those persons, and the direction and speed of their movement.

With the above-mentioned technique according to related art, the movement directions of multiple persons are predicted individually.

Accordingly, for example, if a person temporarily disappears from the view of a camera due to camera occlusion or other causes, it is not possible to determine the direction of movement of the disappeared person. It is thus not possible to predict the line of human movement with high accuracy.

In other words, the above-mentioned technique according to related art needs further improvement.

The present disclosure provides a human flow analysis method, a human flow analysis apparatus, and a human flow analysis system that make it possible to predict the line of movement of each person with improved accuracy.

A human flow analysis method according to an aspect of the present disclosure relates to a human flow analysis method for a human flow analysis apparatus. The human flow analysis method includes acquiring movement information, the movement information representing a history of movement within a predetermined space by multiple persons moving within the predetermined space, extracting, based on the acquired movement information, at least two persons assumed to be moving in association with each other, identifying association information, the association information indicating what association the extracted at least two persons have with each other, determining, based on the identified association information, whether to group the at least two persons together, and predicting a behavior of the at least two persons who have been determined to be grouped together.

According to this configuration, movement information is acquired. The movement information represents a history of movement of multiple persons within a predetermined space. Based on the acquired movement information, at least two persons assumed to be moving in association with each other are extracted. Association information is then identified, which indicates what association the extracted at least two persons have with each other. Based on the identified association information, it is determined whether to group the at least two persons together. The behavior of the at least two persons who have been determined to be grouped together is predicted.

Consequently, it is determined whether to group together at least two persons who are assumed to be moving in association with each other, and if the at least two persons are determined to be grouped together, their behavior is predicted. This makes it possible to predict the line of movement of each person with improved accuracy.

In one possible configuration of the above-mentioned human flow analysis method, the extracting includes extracting the at least two persons whose distance from each other has been less than or equal to a predetermined distance for a predetermined period of time.

According to this configuration, at least two persons whose distance from each other has been less than or equal to a predetermined distance for a predetermined period of time can be assumed to be moving in association with each other. This makes it possible to reliably extract at least two persons who are moving in association with each other.

In one possible configuration of the above-mentioned human flow analysis method, the extracting includes calculating, for all combinations of two persons included in the multiple persons, the distance between the two persons, and extracting, as the at least two persons, each of all combinations of two persons corresponding to a distance less than a predetermined threshold among all the calculated distances.

According to this configuration, distances between multiple persons are calculated within a predetermined area, and two persons corresponding to a distance less than a predetermined threshold among all the calculated distances are extracted. This makes it possible to reliably extract two persons moving in association with each other.

In one possible configuration of the above-mentioned human flow analysis method, the extracting further includes extracting, as the least two persons, two persons assumed to be moving in association with each other from among the plurality of persons, by using a positional relationship between the two persons with respect to a direction of travel of the two persons.

According to this configuration, as the at least two persons mentioned above, two persons assumed to be moving in association with each other are extracted from among multiple persons by using the positional relationship between the two persons with respect to the direction of travel of the two persons. This makes it possible to reliably extract at least two persons who are moving in association with each other.

In one possible configuration of the above-mentioned human flow analysis method, the identifying of the association information further includes, if the angle formed between a straight line connecting the top parts of the heads of the two persons, and the direction of travel of the two persons is within a predetermined range centered at 90 degrees, identifying that the two persons, as the at least two persons, have an association with each other that represents friends, a couple, or a family.

According to this configuration, if the angle formed between a straight line connecting the top parts of the heads of two persons, and the direction of travel of the two persons is within a predetermined range centered at 90 degrees, the two persons are identified, as the at least two persons, to be associated with each other as friends, a couple, or a family.

Consequently, if two mutually associated persons are moving while having a conversation, the angle formed between a straight line connecting the top parts of the heads of the two persons, and their direction of travel is within a predetermined range centered at 90 degrees. Accordingly, if the angle formed between a straight line connecting the top parts of the heads of two persons, and their direction of travel is determined to be within a predetermined range centered at 90 degrees, association information can be easily identified.

In one possible configuration of the above-mentioned human flow analysis method, the identifying of the association information further includes, if the angle formed between a straight line connecting the top parts of the heads of the two persons, and the direction of travel of the two persons is less than or equal to a predetermined angle, identifying that the two persons, as the at least two persons, have an association with each other that represents a person in wheelchair and a caregiver.

According to this configuration, if the angle formed between a straight line connecting the top parts of the heads of two persons, and their direction of travel is less than or equal to a predetermined angle, the two persons are identified, as the at least two persons, to have an association with each other that represents a person in wheelchair and a caregiver.

Consequently, if two persons are a person in wheelchair and his or her caregiver, the angle formed between a straight line connecting the top parts of the heads of the two persons, and their direction of travel becomes substantially zero degrees. Accordingly, if the angle formed between a straight line connecting the top parts of the heads of two persons, and their direction of travel is determined to be less than or equal to a predetermined angle, association information can be easily identified.

In one possible configuration of the above-mentioned human flow analysis method, the extracting further includes extracting the at least two persons by using information indicating that at least two persons among the multiple persons have successively passed through a gate, the gate allowing a predetermined number of persons to pass through the gate at a time.

According to this configuration, at least two persons among multiple persons are extracted by using information indicating that the at least two persons have successively passed through a gate that allows only a predetermined number of persons to pass through at a time.

Consequently, if, among multiple persons, at least two persons have successively passed through a gate that allows only a predetermined number of persons to pass through at a time, the at least two persons can be identified to be moving in association with each other.

In one possible configuration of the above-mentioned human flow analysis method, the human flow analysis method further includes acquiring an appearance image of the multiple persons, and the identifying includes discriminating the respective ages and sexes of the at least two persons from the respective facial images of the at least two persons included in the acquired appearance image, and identifying the association information by using the respective ages and sexes of the at least two persons that have been discriminated.

According to this configuration, an appearance image of multiple persons is acquired. From the respective facial images of at least two persons included in the acquired appearance image, the respective ages and sexes of the at least two persons are discriminated, and association information is identified by using the respective ages and sexes of the at least two persons that have been discriminated.

Consequently, it is possible to identify, from the combination of the respective ages and sexes of the at least two persons that have been discriminated, what association the at least two persons have with each other.

In one possible configuration of the above-mentioned human flow analysis method, the human flow analysis method further includes acquiring gaze information, the gaze information representing the gaze directions of the multiple persons, and the identifying includes identifying the association information by using the gaze directions of the at least two persons included in the acquired gaze information.

According to this configuration, gaze information representing the gaze directions of multiple persons is acquired. Association information is identified by using the gaze directions of at least two persons included in the acquired gaze information.

Consequently, if the gaze directions of at least two persons intersect, or if the gaze directions of two persons are the same, it can be determined that there is some association between the two persons.

In one possible configuration of the above-mentioned human flow analysis method, the identifying includes identifying the association information if the gaze directions of the at least two persons point toward an identical object.

According to this configuration, if the gaze directions of at least two persons point toward an identical object, association information is identified. Therefore, at least two persons gazing at an identical object can be determined to have some association with each other.

In one possible configuration of the above-mentioned human flow analysis method, the identical object is a belonging of one of the at least two persons.

According to this configuration, at least two persons gazing at a belonging of one of the at least two persons can be determined to have some association with each other.

In one possible configuration of the above-mentioned human flow analysis method, the identical object is a physical object that presents public guidance information.

According to this configuration, at least two persons gazing at an object that presents public guidance information can be determined to have some association with each other.

In one possible configuration of the above-mentioned human flow analysis method, the acquiring of the gaze information includes acquiring the gaze information in which the facial orientations of the multiple persons detected from an appearance image of the multiple persons are assumed to be the gaze directions of the multiple persons.

According to this configuration, gaze information is acquired in which the facial orientations of multiple persons detected from an appearance image of the multiple persons are assumed to be the gaze directions of the multiple persons.

This ensures that even if it is not possible to detect the gaze direction of a person, the gaze direction can be estimated from the facial orientation of the person.

In one possible configuration of the above-mentioned human flow analysis method, the human flow analysis method further includes acquiring audio information of speech uttered by each of the multiple persons, and the identifying includes identifying the association information by using, among the acquired audio information, the audio information of the at least two persons having a conversation.

According to this configuration, the audio information of speech uttered by each of multiple persons is acquired. Association information is identified by using, among the acquired audio information, audio information of at least two persons having a conversation.

Consequently, if audio information of at least two persons having a conversation includes a word that allows the association between the at least two persons to be identified, it is possible to identify what association the at least two persons have.

In one possible configuration of the above-mentioned human flow analysis method, the identifying includes identifying the association information by extracting, from the audio information of the at least two persons having a conversation, a proper noun, or a keyword that identifies kinship.

According to this configuration, from audio information of at least two persons having a conversation, a proper noun, or a keyword that identifies kinship is extracted to thereby identify association information.

Consequently, if a conversation between at least two persons includes a proper noun, or a keyword that identifies kinship, it is possible to identify what association the at least two persons have with each other.

In one possible configuration of the above-mentioned human flow analysis method, the predicting includes predicting the direction of movement on a group-by-group basis for each grouping of the at least two persons, by using the association information of the at least two persons and the movement information of the at least two persons.

According to this configuration, the direction of movement can be predicted on a group-by-group basis for each grouping of at least two persons, by using the association information of the at least two persons and the movement information of the at least two persons.

In one possible configuration of the above-mentioned human flow analysis method, the predicting includes predicting the direction of movement on a group-by-group basis for each grouping of the at least two persons, by using the association information of the at least two persons and area type information, the area type information representing the type of the association information that is associated with an area existing within the predetermined space.

According to this configuration, the direction of movement can be predicted on a group-by-group basis for each grouping of at least two persons, by using the association information of the at least two persons and area type information, the area type information representing the type of association information that is associated with an area existing within a predetermined space.

Consequently, if the type of association information of at least two persons matches the type of association information that is associated with an area existing within a predetermined space, a group obtained by grouping the at least two persons together can be predicted to be moving toward this area.

In one possible configuration of the above-mentioned human flow analysis method, the human flow analysis method further includes recalculating the distance between the at least two persons previously determined to be grouped together after the at least two persons are grouped together, and ungrouping the at least two persons who have been grouped together if the recalculated distance exceeds a predetermined distance.

According to this configuration, the distance between at least two persons previously determined to be grouped together is recalculated after the two persons are grouped other, and the at least two persons who have been grouped together are ungrouped if the recalculated distance exceeds a predetermined distance.

Consequently, if at least two persons who have been moving together start to move separately, the at least two persons can be ungrouped. This helps accurately predict the direction of movement on a group-by-group basis.

A human flow analysis apparatus according to another aspect of the present disclosure includes a movement information acquirer that acquires movement information, the movement information representing a history of movement within a predetermined space by multiple persons moving within the predetermined space, an associated-persons extractor that, based on the movement information acquired by the movement information acquirer, extracts at least two persons assumed to be moving in association with each other, an association information identifier that identifies association information, the association information indicating what association the at least two persons extracted by the associated-persons extractor have with each other, a grouping determiner that, based on the association information identified by the association information identifier, determines whether to group the at least two persons together, and a behavior predictor that predicts a behavior of the at least two persons who have been determined by the grouping determiner to be grouped together.

According to this configuration, movement information is acquired. The movement information represents a history of movement within a predetermined space by multiple persons moving within the predetermined space. Based on the acquired movement information, at least two persons assumed to be moving in association with each other are extracted. Association information is then identified, which indicates what association the extracted at least two persons have with each other. Based on the identified association information, it is determined whether to group the at least two persons together. The behavior of the at least two persons who have been determined to be grouped together is predicted.

Consequently, it is determined whether to group together at least two persons who are assumed to be moving in association with each other, and if the at least two persons are determined to be grouped together, their behavior is predicted. This makes it possible to predict the line of movement of each person with improved accuracy.

A human flow analysis system according to another aspect of the present disclosure includes a human flow analysis apparatus, and a terminal apparatus communicatively connected to the human flow analysis apparatus via a network. The human flow analysis apparatus includes a movement information acquirer that acquires movement information, the movement information representing a history of movement within a predetermined space by multiple persons moving within the predetermined space, an associated-persons extractor that, based on the movement information acquired by the movement information acquirer, extracts at least two persons assumed to be moving in association with each other, an association information identifier that identifies association information, the association information indicating what association the at least two persons extracted by the associated-persons extractor have with each other, a grouping determiner that, based on the association information identified by the association information identifier, determines whether to group the at least two persons together, a behavior predictor that predicts a behavior of the at least two persons who have been determined by the grouping determiner to be grouped together, and a transmitter that transmits a behavior prediction result to the terminal apparatus, the behavior prediction result representing the behavior of the at least two persons predicted by the behavior predictor. The terminal apparatus includes a receiver that receives the behavior prediction result transmitted by the human flow analysis apparatus, and a display that displays the behavior prediction result received by the receiver.

According to this configuration, the human flow analysis apparatus analyzes the flow of multiple persons moving within a predetermined space. The terminal apparatus is communicatively connected to the human flow analysis apparatus via the network. In the human flow analysis apparatus, movement information representing a history of movement of multiple persons within a predetermined space is acquired. Based on the acquired movement information, at least two persons assumed to be moving in association with each other are extracted. Association information is then identified, which indicates what association the extracted at least two persons have with each other. Based on the identified association information, it is determined whether to group the at least two persons together. The behavior of the at least two persons who have been determined to be grouped together is predicted. A behavior prediction result representing the predicted behavior of the at least two persons is transmitted to the terminal apparatus. In the terminal apparatus, the behavior prediction result transmitted by the human flow analysis apparatus is received. The received behavior prediction result is displayed.

Consequently, it is determined whether to group together at least two persons who are assumed to be moving in association with each other, and if the at least two persons are determined to be grouped together, their behavior is predicted. This makes it possible to predict the line of movement of each person with improved accuracy.

Hereinafter, embodiments of the present disclosure will be described with reference to the accompanying drawings. Each of the embodiments described below is illustrative of an exemplary implementation of the present disclosure, and is not intended to limit the technical scope of the present disclosure.

Embodiment 1

FIG. 1 illustrates the configuration of a human flow analysis system according to Embodiment 1 of present disclosure.

A human flow analysis system illustrated in FIG. 1 includes a human flow analysis apparatus 1, a first camera 2, a second camera 3, and a microphone 4.

The first camera 2, which is disposed at a location that provides a downward view of the area within a predetermined space, acquires a downward-view image of the area within a predetermined space at different timings. Such different timings may be, for example, fixed intervals of time. For example, if the predetermined space is a store, the first camera 2 is disposed on the ceiling inside the store. The first camera 2 recognizes the head portion of a person node from a captured image, assigns a node ID for identifying the recognized head portion, and generates movement information that associates the time of image capture, node ID, and coordinate position with each other. A person node represents a person. A coordinate position is represented as a coordinate value in the two-dimensional coordinate system that represents the predetermined space. The first camera 2 captures an image every predetermined interval of time (e.g., every two minutes), and generates movement information. The first camera 2 may constantly capture an image, and generate movement information every predetermined intervals of time (e.g., every two minutes). The first camera 2 transmits the generated movement information to the human flow analysis apparatus 1.

Although the human flow analysis system according to Embodiment 1 includes a single first camera 2, the present disclosure does not particularly limit the number of first cameras 2 to one. Instead, the human flow analysis system may include multiple first cameras 2. Such multiple first cameras 2 may each capture an image of the corresponding region of a predetermined space divided into multiple regions, and then multiple such captured images may be combined.

The second camera 3 is disposed within a predetermined space to acquire, at different timings, a captured image of the appearance of each of multiple person nodes that are present within the predetermined space. Such different timings may be, for example, fixed intervals of time. In particular, the second camera 3 acquires an appearance image including the faces of multiple persons. The second camera 3 transmits image information represented by the captured appearance image to the human flow analysis apparatus 1. Desirably, the second camera 3 captures an image at the same timing as the first camera 2.

Although the human flow analysis system according to Embodiment 1 includes a single second camera 3, the present disclosure does not particularly limit the number of second cameras 3 to one. Instead, the human flow analysis system may include multiple second cameras 3. Such multiple second cameras 3 may each capture an image of the corresponding region of a predetermined space divided into multiple regions. This may be accomplished by, for example, dividing the two-dimensional plane of the predetermined space into 10×10 regions, and placing the second camera 3 in each region. Each of the second cameras 3 may capture an image of the area within the corresponding region, and transmit the resulting image information to the human flow analysis apparatus 1 together with a two-dimensional coordinate position that identifies the position where the image has been captured. This makes it possible to identify a position within the predetermined space where the image has been acquired.

The microphone 4 collects the audio of speech uttered by each of multiple persons within a predetermined space, and transmits the collected audio information to the human flow analysis apparatus 1. For example, the human flow analysis system may include multiple microphones 4. Such multiple microphones 4 each collect the audio of the corresponding region of a predetermined space divided into multiple regions, and transmit the audio information to the human flow analysis apparatus 1 together with the two-dimensional coordinate position of the region from which the corresponding audio information has been collected. This may be accomplished by, for example, dividing the two-dimensional plane of the predetermined space into 10×10 regions, and placing the microphone 4 in each divided region. Each of the microphones 4 may collect the audio of speech uttered in the corresponding region, and transmit the audio information to the human flow analysis apparatus 1 together with a two-dimensional coordinate position that identifies the position where the audio has been collected. This makes it possible to identify a position within the predetermined space where the audio has been collected.

The human flow analysis apparatus 1 is connected to the first camera 2, the second camera 3, and the microphone 4 via a network 5 in a manner that allows its communication with these components. The network 5 is, for example, the Internet. The human flow analysis apparatus 1 is, for example, a server, and includes a communicator 11, a memory 12, and a controller 13.

The communicator 11 receives information from the first camera 2, the second camera 3, and the microphone 4 via the network 5. The communicator 11 includes a movement information acquirer 111, an image information acquirer 112, and an audio information acquirer 113. The communicator 11 may include, for example, a communication circuit serving as a hardware component.

The movement information acquirer 111 acquires movement information representing a history of movement of multiple person nodes within a predetermined space. The movement information acquirer 111 receives movement information transmitted by the first camera 2.

FIG. 2 illustrates exemplary movement information according to Embodiment 1. The movement information illustrated in FIG. 2 includes the time of image capture by the first camera 2, a node ID used to identify a person node, and a coordinate position representing where a person node is located within a predetermined space. The x- and y-coordinate values of the coordinate position each represent a position in the two-dimensional plane of the predetermined space, and the z-coordinate value of the coordinate position represents floor number in a building. For example, in FIG. 2, the person node with the node ID "ABX123" is present, at 15:05, at a position on the third floor of the building that is represented by the coordinates (215, 341) in the two-dimensional coordinate system. At this time, the origin of the two-dimensional coordinate system is set at, for example, one of multiple corners of the predetermined space.

The movement information acquirer 111 outputs the received movement information to an associated-nodes extractor 131. The movement information acquirer 111 may also store the received movement information into the memory 12.

It is also possible for the movement information acquirer 111 to employ, for example, a graph optimization process to perform multi-person tracking that identifies the node ID of each of multiple persons who appear in the view of the first camera 2 at each given time. In multi-person tracking using a graph optimization process, the movement information acquirer 111 creates a graph by using the results of detection of persons within images captured at various times by the first camera 2. In multi-person tracking using a graph optimization process, the movement information acquirer 111 is able to determine the movement trajectories of multiple persons by finding an optimal path from among all the paths that extend from the start point to the end point on a graph.

Figure 3:
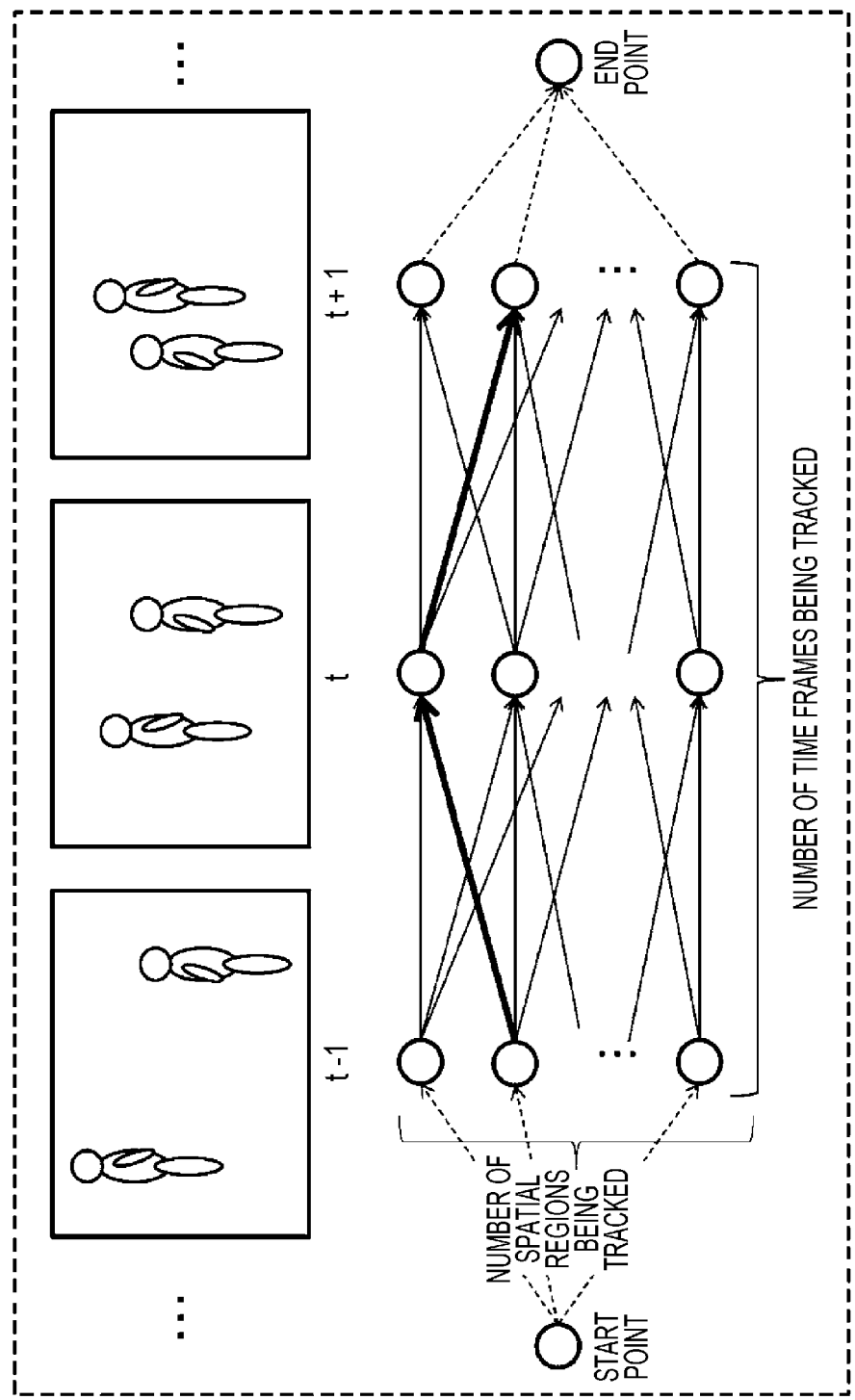
FIG. 3 is a schematic illustration for person tracking using a graph optimization process.

FIG. 3 is a schematic illustration for person tracking using a graph optimization process.

The movement information acquirer 111 may use the K-Shortest Paths algorithm as a specific graph optimization process. If the K-Shortest Paths algorithm is used, each person node in a graph may specifically represent a coordinate position in a spatial region at each time frame as illustrated in FIG. 3. Each edge connecting a pair of person nodes may be set to a weight value determined from the probability of human existence. Then, the movement information acquirer 111 may regard K shortest paths found by using the K-Shortest Paths algorithm as the movement trajectories of K persons.

The complexity of the above-mentioned graph optimization process increases with increasing area of a spatial region, with increasing length of tracking time, or with increasing number of persons detected. Accordingly, the spatial region, or the time region subject to tracking is divided into multiple sub-regions, and parallel computation is performed with computational resources allocated to each individual sub-region to thereby enable high-speed computation. Further, using a large scale computer on a cloud enables more efficient computation.

The image information acquirer 112 acquires image information representing the appearance image of multiple person nodes. The image information acquirer 112 receives image information transmitted by the second camera 3. The image information acquirer 112 outputs the received image information to an association information identifier 132.

The audio information acquirer 113 acquires audio information of speech uttered by each of multiple person nodes. The audio information acquirer 113 receives audio information transmitted by the microphone 4. The audio information acquirer 113 outputs the received audio information to the association information identifier 132.

The memory 12 is implemented by, for example, a read only memory (ROM), a random access memory (RAM), or a hard disk drive. The memory 12 may store movement information, image information, and audio information that have been received by the communicator 11.

The controller 13 may include, for example, a processor such as a central processing unit (CPU) as a hardware component. The controller 13 includes the associated-nodes extractor 131, the association information identifier 132, a node fusion determiner 133, and a behavior predictor 134.

The associated-nodes extractor 131 extracts, based on movement information acquired by the movement information acquirer 111, at least two person nodes assumed to be moving in association with each other. The associated-nodes extractor 131 extracts at least two person nodes whose distance from each other has been less than or equal to a predetermined distance for a predetermined period of time. For example, if two persons are moving while keeping a distance from each other less than or equal to a predetermined distance, then it is possible to assume that these two persons are moving in association with each other.

The association information identifier 132 identifies association information, which indicates what association at least two person nodes extracted by the associated-nodes extractor 131 have with each other. Specifically, from the respective facial images of at least two person nodes included in the appearance image acquired by the image information acquirer 112, the association information identifier 132 discriminates the respective ages and sexes of the at least two person nodes, and identifies association information by using the respective ages and sexes of the at two person nodes that have been discriminated.

For example, if three extracted person nodes are identified to include a first person node representing a 40-year old man, a second person node representing a 40-year old woman, and a third person node representing an infant, then the association between the three person nodes can be determined to be that of parents and child. For example, Japanese Unexamined Patent Application Publication No. 2011-123657 discloses a technique that determines the family composition in a household from the age and sex of each individual person in a family. Further, the association between two person nodes that are of the same sex and similar in age can be determined to be that of friends, and the association between two person nodes that are opposite in sex and similar in age can be determined to be that of couple.

Alternatively, the association information identifier 132 may identify association information by using, among various audio information acquired by the audio information acquirer 113, audio information of at least two person nodes having a conversation. The association information identifier 132 may identify association information by extracting, from the audio information of at least two persons having a conversation, a proper noun, or a keyword for identifying kinship. For example, if a conversation between two extracted person nodes includes a keyword that allows a parent-child relationship to be assumed, such as "father", then it is possible to identify that the association between these two person nodes is that of parent and child.

The node fusion determiner 133 determines whether to group at least two person nodes together, based on association information identified by the association information identifier 132. That is, if association information has been identified by the association information identifier 132, then the node fusion determiner 133 determines to group the at least two person nodes together.

The node fusion determiner 133 gives a label representing association information to a fusion node, which is a node obtained by grouping at least two person nodes together.

FIG. 4 illustrates exemplary labels given to fusion nodes according to Embodiment 1. As illustrated in FIG. 4, labels representing association information have major categories, and minor categories that are subdivisions of the major categories. Examples of major categories include family, friends, and couple. Examples of minor categories for family include father- and mother-infant group, father- and mother-toddler group, and mother-grade schooler group. Examples of minor categories for friends include 10's female friend group and 20's male friend group. Examples of minor categories for couple include 10's male-female pair and 20's male-female pair.

The association information identifier 132 identifies which association information falling under at least major categories, such as family, friends, and couple, the association information of at least two extracted person nodes corresponds to. The association information identifier 132 may further identify which association information falling under minor categories, such as father- and mother-infant group, 10's female friend group, and 10's male-female pair, the association information of the extracted at least two person nodes corresponds to.

When the node fusion determiner 133 determines to group at least two person nodes together, the node fusion determiner 133 generates fusion node information related to a fusion node obtained by grouping the at least two person nodes together, and stores the generated fusion node information into the memory 12.

FIG. 5 illustrates exemplary fusion node information according to Embodiment 1. The fusion node information illustrated in FIG. 5 includes fusion node ID for identifying each fusion node, node IDs for identifying at least two person nodes, major category label, and minor category label. When the node fusion determiner 133 determines to group at least two person nodes together, the node fusion determiner 133 gives a fusion node ID to the resulting fusion node. For example, fusion node information with the fusion node ID "XYZ111" in FIG. 5 includes the node IDs "ABX123" and "ABX125" of grouped nodes, with the label "family" given as the major category and the label "mother-toddler group" given as the minor category.

The behavior predictor 134 predicts the behavior of at least two person nodes that the node fusion determiner 133 have determined to group together. The behavior predictor 134 uses the following pieces of information to predict the movement direction of a fusion node (group node) obtained by grouping the at least two person nodes together: the association information of the at least two person nodes, and movement information of the at least two person nodes that have been determined to be grouped together.

Figure 6:
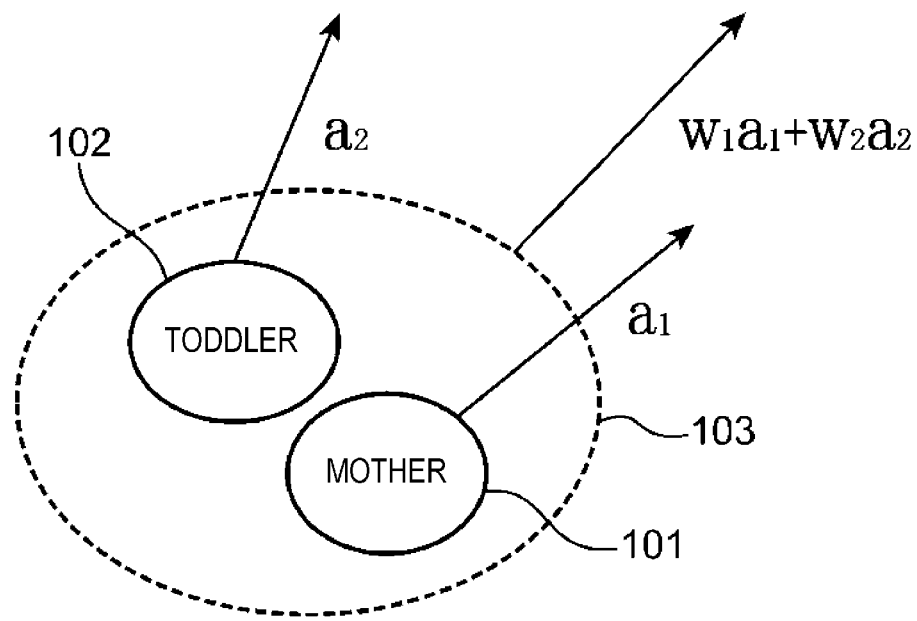
FIG. 6 is a schematic illustration for a process to predict the movement direction of a fusion node according to Embodiment 1.

FIG. 6 is a schematic illustration for a process to predict the movement direction of a fusion node according to Embodiment 1.

In FIG. 6, a first person node 101 represents a mother, a second person node 102 represents a toddler, and a fusion node 103, which is obtained by grouping the first person node 101 and the second person node 102 together, is associated with the association information "mother-toddler group".

The movement direction of each of the first person node 101 and the second person node 102 is represented by vector orientation, and the speed of movement of each of the first person node 101 and the second person node 102 is represented by vector magnitude. The movement direction of the fusion node 103 is calculated by the sum ($w_1 a_1 + w_2 a_2$) of the weighted vector $w_1 a_1$ of the first person node 101, and the weighted vector $w_2 a_2$ of the second person node 102.

This ensures that, for example, even if one of two person nodes that form a fusion node disappears due to camera occlusion or other causes, the movement direction of the disappeared person node can be estimated by using the movement information of the other person node.

The second person node 102 representing a toddler moves in dependence on the first person node 101 representing a mother. For this reason, the weight $w_1$ of the first person node 101 is preferably greater than the weight $w_2$ of the second person node 102 ($w_1 > w_2$). In particular, the weight $w_2$ of the second person node 102 may be set to zero such that the movement direction of the fusion node is represented solely by the movement direction of the first person node 101.

This helps save computational resources required to estimate the movement direction of the fusion node. In particular, in performing person tracking using a graph optimization process such as K-Shortest Paths, fusing person nodes reduces the number of nodes in a graph, thus allowing for a significant reduction in computational complexity. For this reason, the process according to the present disclosure proves particularly advantageous in estimating human flow by use of a graph optimization process.

Although the human flow analysis apparatus according to Embodiment 1 acquires both image information and audio information, the present disclosure is not particularly limited to this arrangement. Alternatively, the human flow analysis apparatus may acquire only one of image information and audio information. If only image information is to be acquired, the audio information acquirer 113 and the microphone 4 are not required, and if only audio information is to be acquired, the image information acquirer 112 and the second camera 3 are not required.

In Embodiment 1, the human flow analysis apparatus 1 corresponds to an example of a human flow analysis apparatus, the movement information acquirer 111 corresponds to an example of a movement information acquirer, the associated-nodes extractor 131 corresponds to an example of an associated-persons extractor, the association information identifier 132 corresponds to an example of an association information identifier, the node fusion determiner 133 corresponds to an example of a grouping determiner, and the behavior predictor 134 corresponds to an example of a behavior predictor.

A process performed by the human flow analysis apparatus according to Embodiment 1 will be described next.

Figure 7:
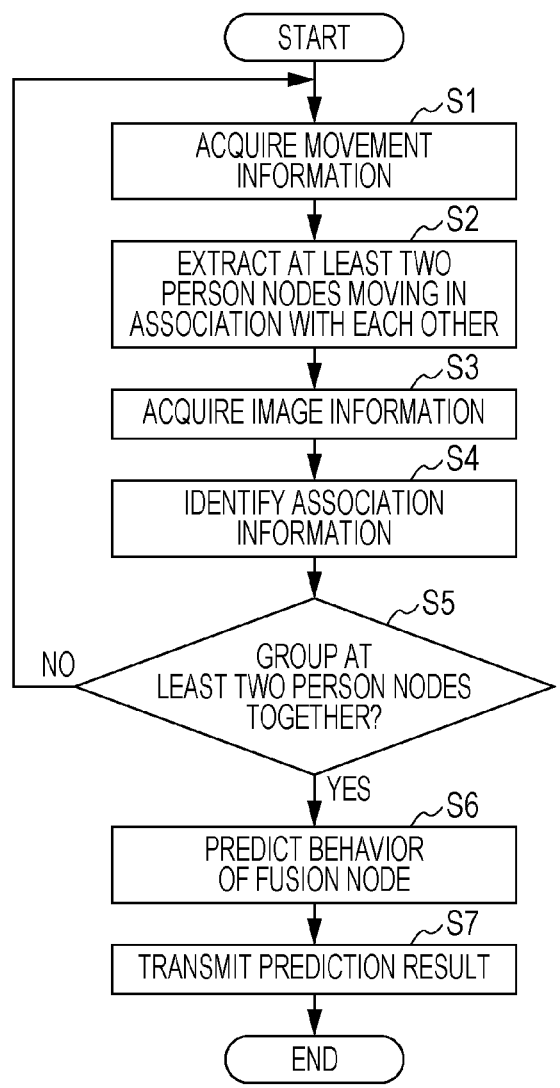
FIG. 7 is a flowchart for a process performed by a human flow analysis apparatus according to Embodiment 1.

FIG. 7 is a flowchart for a process performed by the human flow analysis apparatus according to Embodiment 1. The following description of the flowchart illustrated in FIG. 7 is directed to a process in which audio information is not acquired and only image information is acquired.

First, at step S1, the movement information acquirer 111 acquires movement information, which represents a history of movement of multiple person nodes within a predetermined space. At this time, the movement information acquirer 111 receives the movement information from the first camera 2.

Although the movement information acquirer 111 receives movement information from the first camera 2 in Embodiment 1, the present disclosure is not particularly limited to this arrangement. Alternatively, the movement information acquirer 111 may receive, from the first camera 2, an image captured from a location that provides a downward view of a predetermined space, and generate movement information from the received image.

Next, at step S2, the associated-nodes extractor 131 extracts, based on the movement information acquired by the movement information acquirer 111, at least two person nodes assumed to be moving in association with each other. At this time, the associated-nodes extractor 131 extracts at least two person nodes whose distance from each other has been less than or equal to a predetermined distance for a predetermined period of time.

Next, at step S3, the image information acquirer 112 acquires image information representing the appearance image of multiple person nodes. At this time, the image information acquirer 112 receives the image information from the second camera 3.

Next, at step S4, the association information identifier 132 identifies association information, which indicates what association the at least two person nodes extracted by the associated-nodes extractor 131 have with each other. At this time, the association information identifier 132 discriminates, from the respective facial images of the at least two person nodes included in the appearance image acquired by the image information acquirer 112, the respective ages and sexes of the at least two person nodes, and identifies association information by using the combination of the ages and sexes of the at two person nodes that have been discriminated.

Next, at step S5, the node fusion determiner 133 determines whether to group the at least two person nodes together, based on the association information identified by the association information identifier 132. At this time, if association information has been identified by the association information identifier 132, then the node fusion determiner 133 determines to group the at least two person nodes together, and if association information has not been identified, the node fusion determiner 133 determines not to group the at least two person nodes together. In this case, if it is determined not to group the at least two person nodes together (NO at step S5), the process returns to step S1.

If it is determined to group the at least two person nodes together (YES at step S5), then at step S6, the behavior predictor 134 sets, as one fusion node, the at least two person nodes that have been determined by the node fusion determiner 133 to be grouped together, and predicts the behavior of the fusion node. For example, the behavior predictor 134 combines the respective movement vectors of the at least two person nodes to calculate the movement vector of the fusion node, and predicts the movement direction of the fusion node from the calculated movement vector.

Next, at step S7, the behavior predictor 134 stores the result of the prediction into the memory 12.

Although the behavior predictor 134 stores the prediction result into the memory 12 in Embodiment 1, the present disclosure is not particularly limited to this arrangement. Alternatively, the communicator 11 may transmit the result of prediction made by the behavior predictor 134 to a terminal apparatus communicatively connected to the human flow analysis apparatus, and the terminal apparatus may display the received prediction result.

Figure 8:
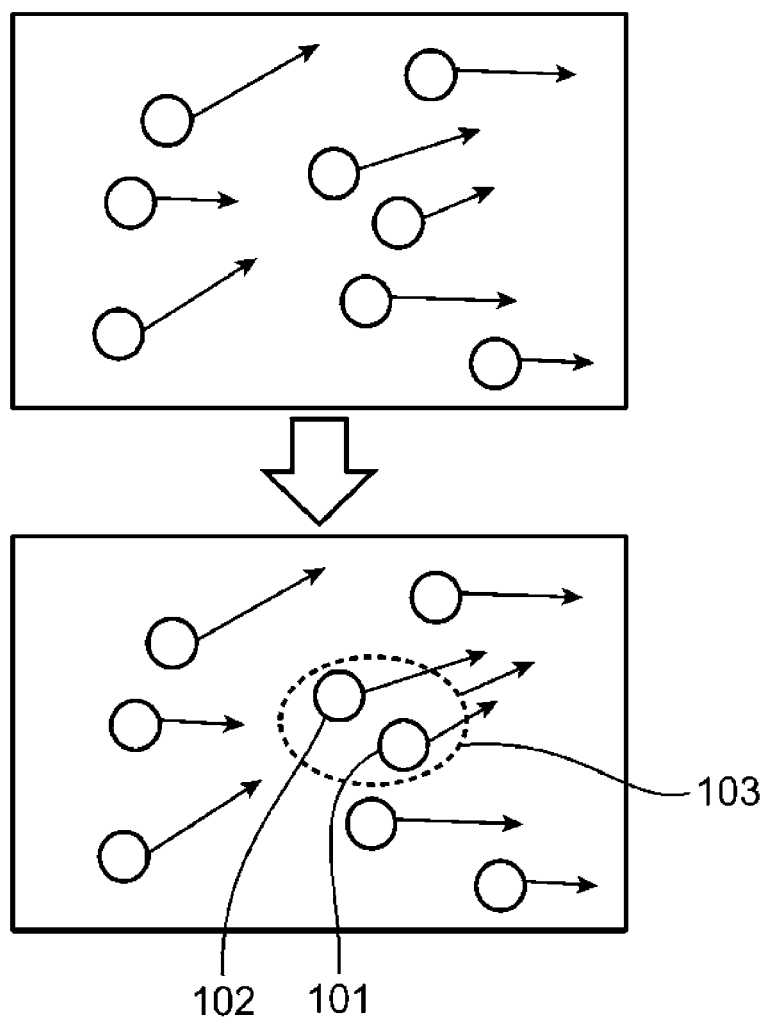
FIG. 8 is a schematic illustration for operation of the human flow analysis apparatus according to Embodiment 1.

FIG. 8 is a schematic illustration for operation of the human flow analysis apparatus according to Embodiment 1. As illustrated in the upper diagram in FIG. 8, with conventional approaches, the respective movement directions (movement vectors) of multiple person nodes are calculated, and the respective destinations of the multiple person nodes are predicted. By contrast, as illustrated in the lower diagram in FIG. 8, in Embodiment 1, the first person node 101 and the second person node 102 are extracted from among multiple person nodes as nodes that are moving in association with each other. Then, association information is identified for the first person node 101 and the second person node 102, and it is determined whether to group the first person node 101 and the second person node 102 together. If it is determined to group the first person node 101 and the second person node 102 together, then the movement direction of the fusion node 103, which is obtained by grouping the first person node 101 and the second person node 102 together, is predicted.

As a result, multiple person nodes that are likely to move together are grouped together, and the direction of their movement is predicted on a group-by-group basis. This helps predict the line of movement of each person with improved accuracy.

The second camera 3 may capture images of multiple person nodes, generate gaze information representing the gaze directions of the multiple person nodes in the two-dimensional plane, and transmit the generated gaze information to the human flow analysis apparatus 1. The communicator 11 of the human flow analysis apparatus 1 may acquire the gaze information representing the gaze directions of the multiple person nodes. Then, the association information identifier 132 may use the gaze directions of at least two person nodes included in the acquired gaze information to identify association information. For example, if the gaze directions of at least two person nodes coincide for a predetermined period of time, the association information identifier 132 may identify association information indicative of the presence of some social association between the at least two person nodes. Further, if the gaze directions of at least two person nodes intersect for a predetermined period of time (when two person nodes are gazing each other), the association information identifier 132 may identify association information indicative of the presence of some social association between the at least two person nodes.

The human flow analysis apparatus 1 may control electrical equipment in accordance with a predicted direction of movement of the fusion node 103. For example, if the electrical equipment is lighting equipment, the human flow analysis apparatus 1 may light up the lighting equipment that is present in the predicted direction of movement of the fusion node 103. In this way, it is possible to control electrical equipment based on a predicted behavior of each person node.

In the foregoing description of Embodiment 1, the associated-nodes extractor 131 assumes that two persons are moving in association with each other if the distance between the two persons has continued to be within a range less than a predetermined distance. The distance between two persons, however, often differs with each environment. Accordingly, the associated-nodes extractor 131 may set a threshold according to the ambient environment of multiple persons, and assume that the multiple persons are moving in association with each other if the distance between the multiple persons is less than the threshold.

Figure 9:
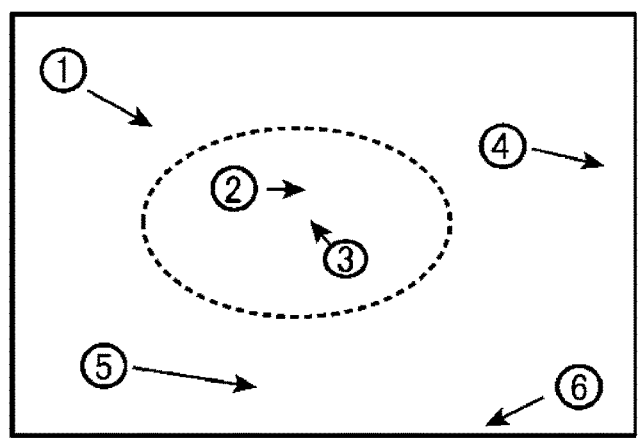
FIG. 9 illustrates an exemplary arrangement of person nodes in an area of low population density.
Figure 10:
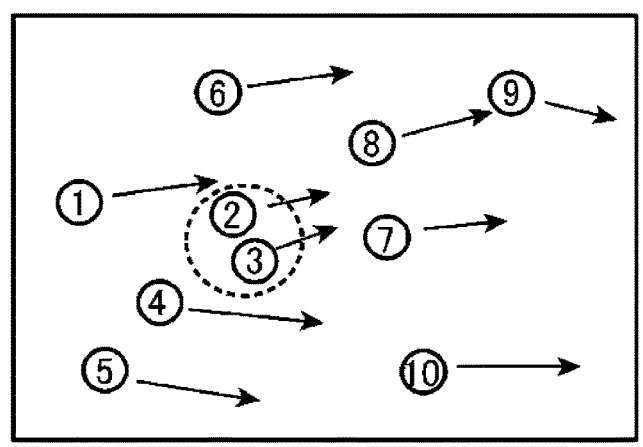
FIG. 10 illustrates an exemplary arrangement of person nodes in an area of high population density.

FIG. 9 illustrates an exemplary arrangement of person nodes in an area of low population density. FIG. 10 illustrates an exemplary arrangement of person nodes in an area of high population density. FIG. 11 illustrates distances between individual person nodes. In FIGS. 9 and 10, each circle indicated by a solid line represents a person node, the number inside each circle represents a node number for identifying each person node, and each arrow represents the movement direction of each person node.

As illustrated in FIG. 9, for example, in a spacious area such as a park, persons who have no association with each other are at a large distance from each other. By contrast, persons who are associated with each other, such as a parent and a child, or acquaintances, are at a relatively short distance, but such associated persons may still be spaced slightly apart from each other in some cases.

As illustrated in FIG. 10, in areas such as congested train stations or intersections, associated persons are at a sufficiently small distance from each other relative to the distance between non-associated persons. Accordingly, the associated-nodes extractor 131 may set, in accordance with the population density of a predetermined space, a threshold value for the distance between two person nodes used to determine that two person nodes are associated with each other. The associated-nodes extractor 131 may calculate the distance between two person nodes for every combination of two persons included in multiple persons who are present within a predetermined space, and then extract, as mutually associated person nodes, two person nodes with a sufficiently small distance from each other among all of the calculated distances.

Specifically, as illustrated in FIG. 11, the associated-nodes extractor 131 may calculate all of the distances between multiple person nodes included in a predetermined space, and extract two person nodes corresponding to a distance less than a predetermined threshold among all the calculated distances. In performing the above-mentioned extraction process, the predetermined space may be divided into multiple subdivided regions, and the extraction process may be performed for each subdivided region. In this case, the threshold distance between two person nodes that is used to determine the presence of an association between the two person nodes may be set in accordance with the population density of each subdivided region.

For example, in FIG. 11, the two person nodes at a distance of "8" from each other are identified to be associated person nodes. At this time, the associated-nodes extractor 131 calculates the population density of a predetermined space where multiple person nodes are present, and sets a threshold according to the calculated population density. The associated-nodes extractor 131 sets a first threshold if the population density is lower than a predetermined value, and sets a second threshold that is less than the first threshold if the population density is higher than or equal to a predetermined value. The associated-nodes extractor 131 extracts, as mutually associated person nodes, two person nodes that are at a distance from each other less than the threshold.

Although the foregoing description of Embodiment 1 is directed to a case in which the associated-nodes extractor 131 extracts two associated person nodes by using the distances between multiple person nodes, the associated-nodes extractor 131 may extract two person nodes from among multiple person nodes by using the positional relationship between the two person nodes with respect to their direction of travel.

Figure 12:
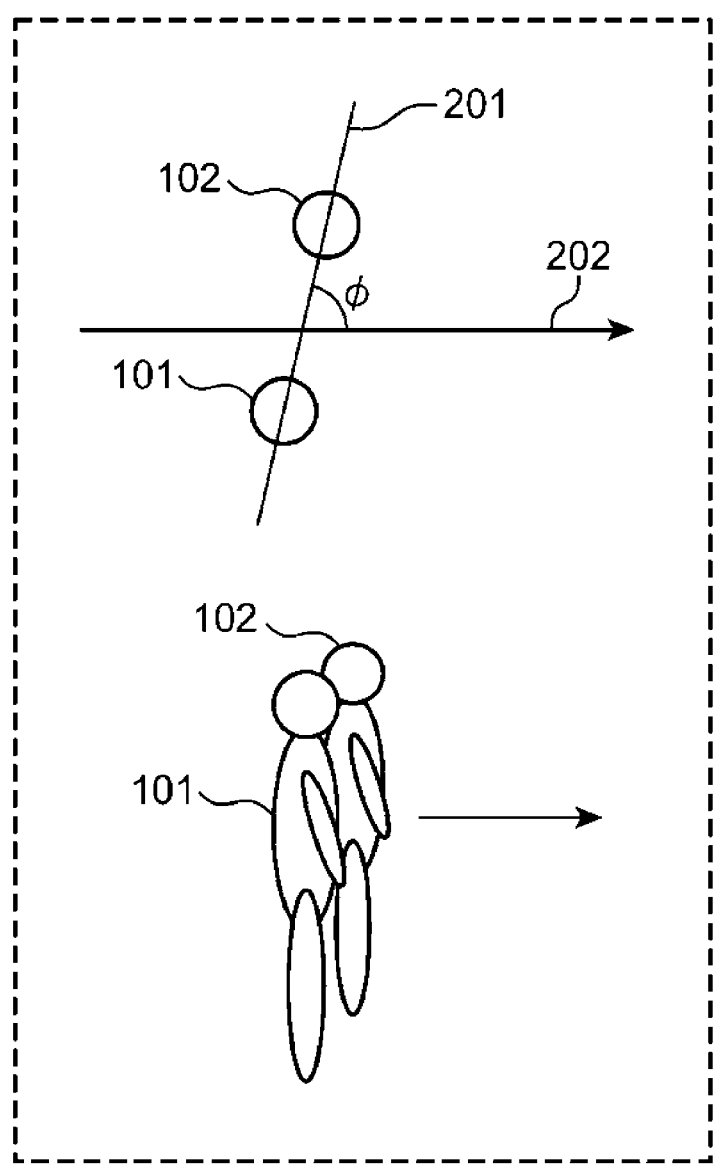
FIG. 12 is a schematic illustration for a first process that extracts two person nodes based on an angle $\phi$ ($\phi$<90 degrees) formed between a straight line connecting the two person nodes and the direction of travel of the two person nodes.
Figure 13:
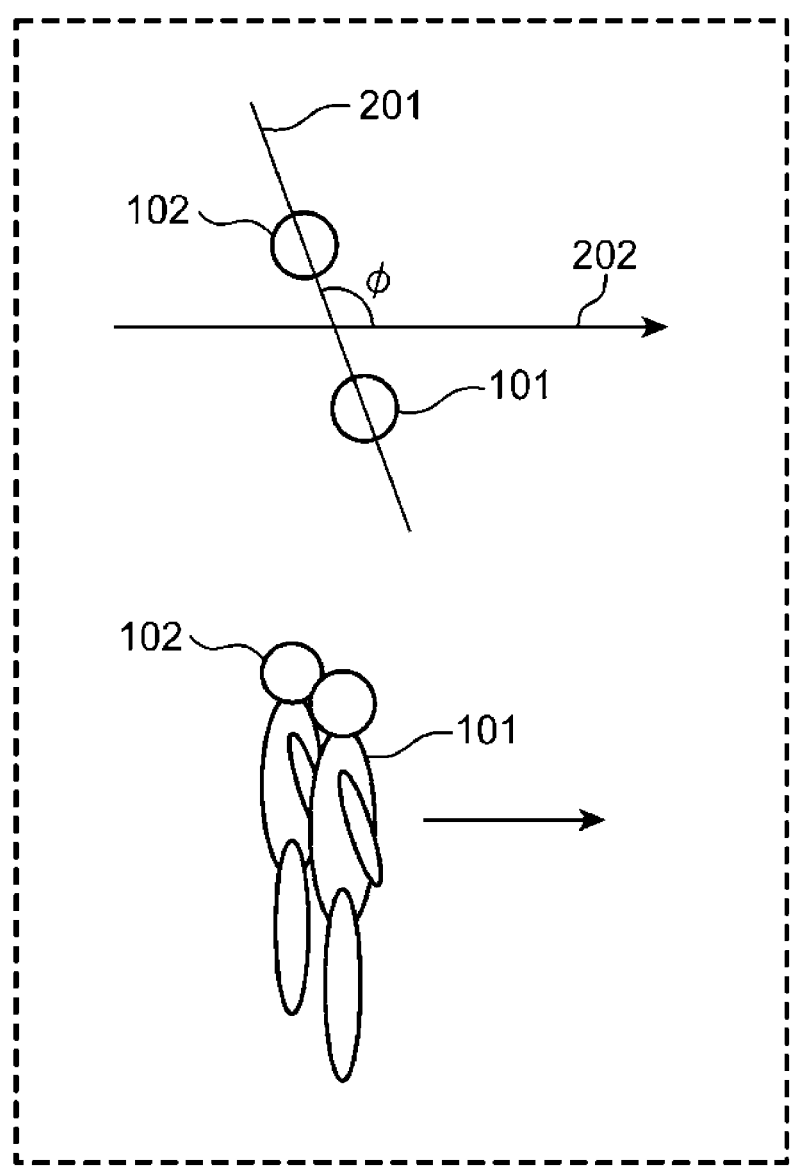
FIG. 13 is a schematic illustration for a first process that extracts two person nodes based on an angle $\phi$ ($\phi$>90 degrees) formed between a straight line connecting the two person nodes and the direction of travel of the two person nodes.

FIG. 12 is a schematic illustration for a first process that extracts two person nodes based on an angle φ (φ<90 degrees) formed between a straight line connecting the two person nodes and the direction of travel of the two person nodes. FIG. 13 is a schematic illustration for a first process that extracts two person nodes based on an angle φ (φ>90 degrees) formed between a straight line connecting the two person nodes and the direction of travel of the two person nodes.

Generally, when two persons are walking while having a conversation, in a downward-view image of the top parts of their heads, a straight line 201 connecting the top parts of the two persons' heads, and a direction of travel 202 of the two persons form an angle φ of substantially 90 degrees. In FIGS. 12 and 13, the angle φ is substantially 90 degrees if the first person node 101 and the second person node 102 are highly associated with each other. By contrast, when the angle φ is close to 180 or 0 degrees, the positional relationship between the two persons is such that it is difficult for the two persons to have a conversation. Accordingly, in Embodiment 1, the associated-nodes extractor 131 may extract two person nodes by use of the angle φ formed between the straight line 201 connecting the two person nodes and the direction of travel 202.

In one example, the associated-nodes extractor 131 may extract two person nodes if the angle φ formed between the straight line 201 connecting the two person nodes and the direction of travel 202 is greater than 80 degrees and less than 110 degrees. In another example, the associated-nodes extractor 131 may extract two person nodes if the distance between the two person nodes in a predetermined period of time is less than or equal to a predetermined distance, and if the angle φ formed between the straight line 201 connecting the two person nodes and the direction of travel 202 is greater than 80 degrees and less than 110 degrees.

Further, in Embodiment 1, the association information identifier 132 may identify association information of two extracted persons by using the angle φ formed between a straight line connecting the two person nodes and their direction of travel. For example, if the angle φ formed by two person nodes exceeds a predetermined value as a result of the two persons walking while having a conversation, then the association information identifier 132 is able to identify that the association information of the two person nodes is that of family, couple, or friends.

The association information identifier 132 may identify that the association between two person nodes is that of friends, couple, or family if the angle φ formed between a straight line connecting the top parts of the heads of the two person nodes and their direction of travel is within a predetermined range centered at 90 degrees. In particular, the association information identifier 132 may identify association information of two extracted person nodes to be that of family, couple, or friends if the angle φ is greater than 80 degrees and less than 110 degrees.

There are cases in which even for two mutually associated person nodes, the angle φ formed between a straight line connecting the two person nodes and their direction of travel does not become substantially 90 degrees.

Figure 14:
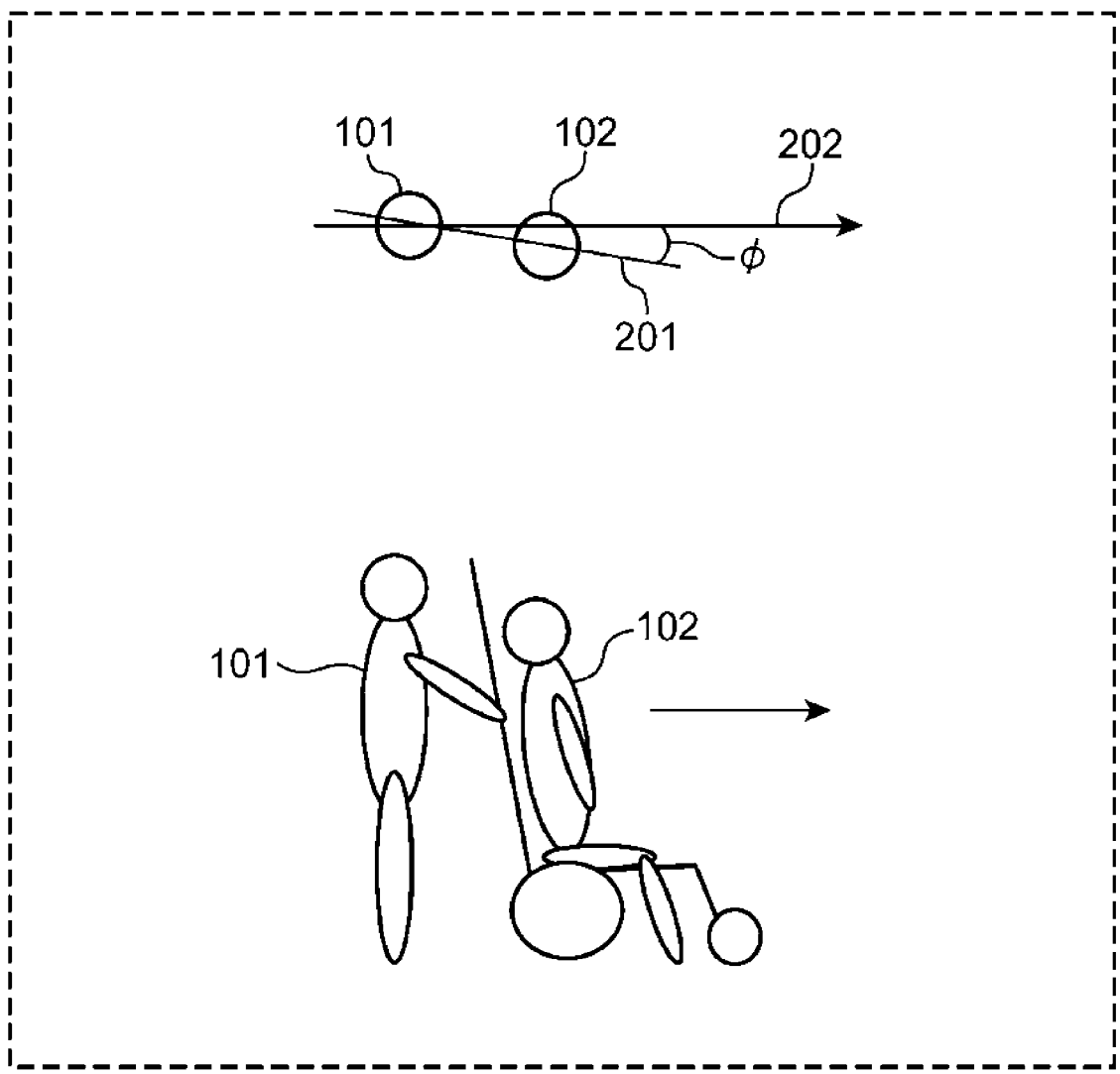
FIG. 14 is a schematic illustration for a second process that extracts two person nodes based on an angle formed between a straight line connecting the two person nodes and the direction of travel of the two person nodes.

FIG. 14 is a schematic illustration for a second process that extracts two person nodes based on an angle formed between a straight line connecting the two person nodes and the direction of travel of the two person nodes.

If, as illustrated in FIG. 14, the first person node 101 represents a caregiver, and the second person node 102 represents a person in wheelchair, the two persons are aligned in their direction of travel, and hence the angle φ becomes less than a predetermined value. Accordingly, if the angle φ formed between the straight line 201 connecting two extracted person nodes and the direction of travel 202 of the two extracted person nodes is less than a predetermined value, the association information identifier 132 is able to identify that the association information of the two extracted person nodes is representative of the relationship of person in wheelchair and his or her caregiver.

The association information identifier 132 identifies the association between two person nodes to be that of person in wheelchair and his or her caregiver if the angle formed between a straight line connecting the top parts of the heads of the two person nodes and their direction of travel is less than or equal to a predetermined angle. In particular, the association information identifier 132 may identify association information of two extracted person nodes to be that of person in wheelchair and his or her caregiver if the angle φ is greater than 0 degrees and less than 20 degrees.

Figure 15:
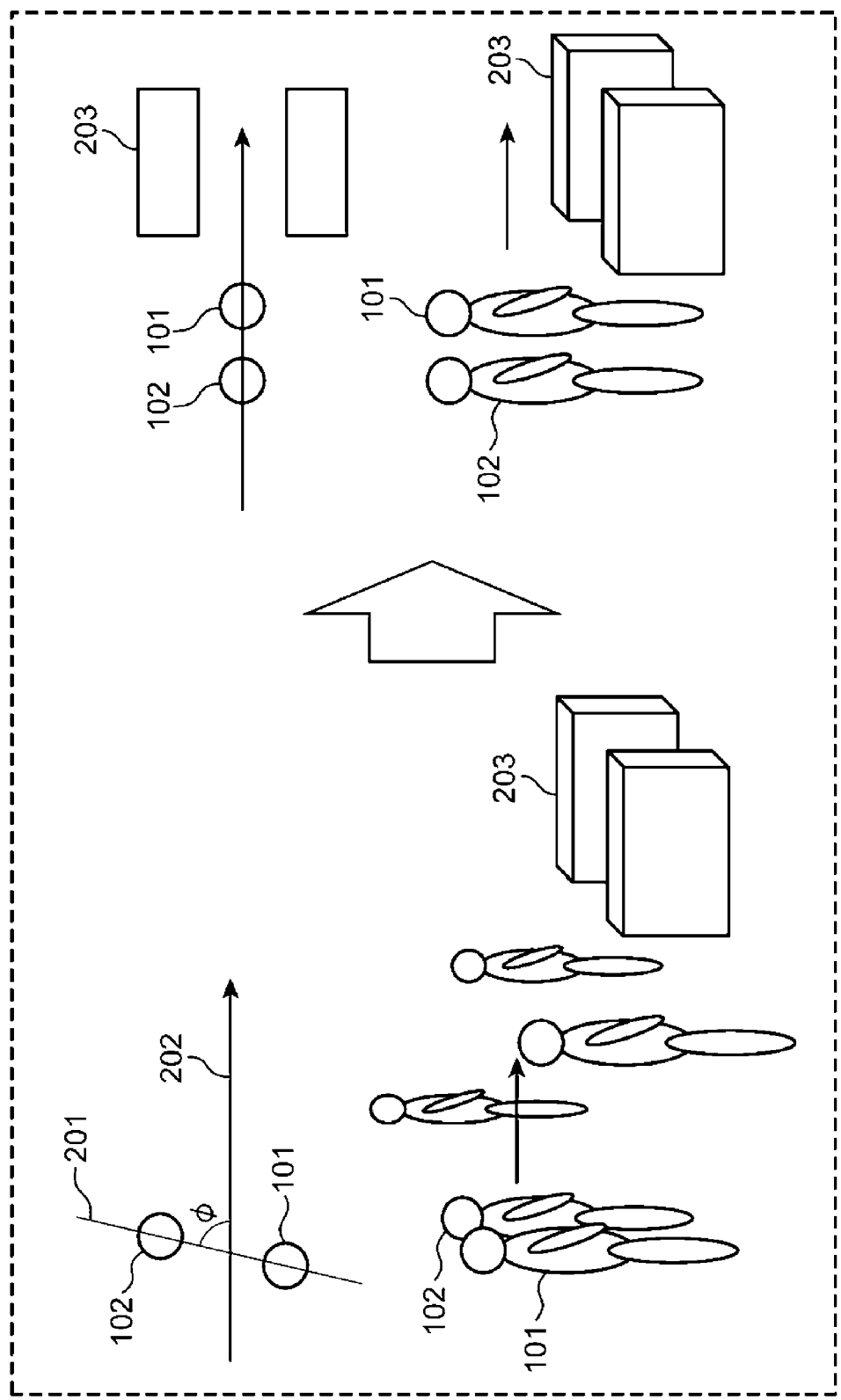
FIG. 15 is a schematic illustration for a process to identify association information according to the positional relationship between two persons passing through a gate.

FIG. 15 is a schematic illustration for a process to identify association information according to the positional relationship between two persons passing through a gate.

For example, if, as illustrated in FIG. 15, the passage of each individual person through a gate 203 is checked in a place such as a train station wicket, the entrance of a public facility, or the exit of a public facility, it is often the case that mutually associated persons pass through the gate successively, or if multiple passage gates are arranged side by side in a direction perpendicular to their direction of travel, the mutually associated persons pass through the gate in line. Accordingly, the associated-nodes extractor 131 may extract at least two person nodes that are assumed to be moving in association with each other, based on the positional relationship between person nodes at the time of their passage through the gate 203.

The associated-nodes extractor 131 extracts two persons by using information indicating that among multiple persons, two persons have successively passed through a gate that allows only a predetermined number of persons to pass through at a time. The associated-nodes extractor 131 extracts two person nodes if, when the two persons pass through the gate 203, the angle φ formed between the straight line 201 connecting the two person nodes and the direction of travel 202 of the two person nodes is zero degrees.

Of the two extracted person nodes, the association information identifier 132 may determine, as a parent, the person node that passes through the gate 203 first, and determine, as a child, the person node that passes through the gate 203 next. The association information identifier 132 may identify the association information of the two extracted person nodes to be that of parent and child.

Although the foregoing description of Embodiment 1 is directed to a case in which the association information identifier 132 identifies association information by using person's gaze information, it is further possible for the association information identifier 132 to identify association information by using the ambient circumstances or the relationship between an object currently being closely observed and the gaze directed toward the object.

Figure 16:
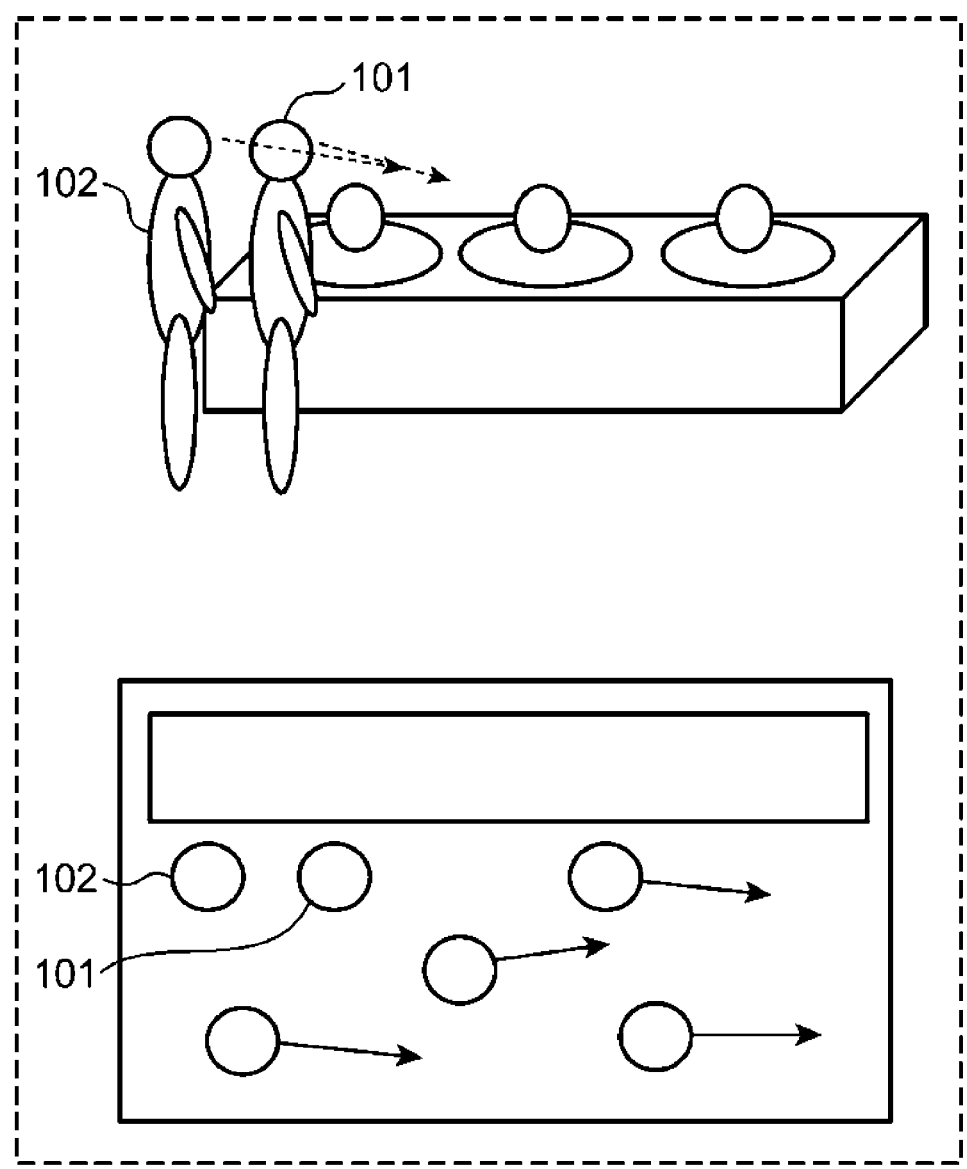
FIG. 16 is a schematic illustration for a process to identify association information of two person nodes that are not moving, based on information about their gaze toward a displayed object.
Figure 17:
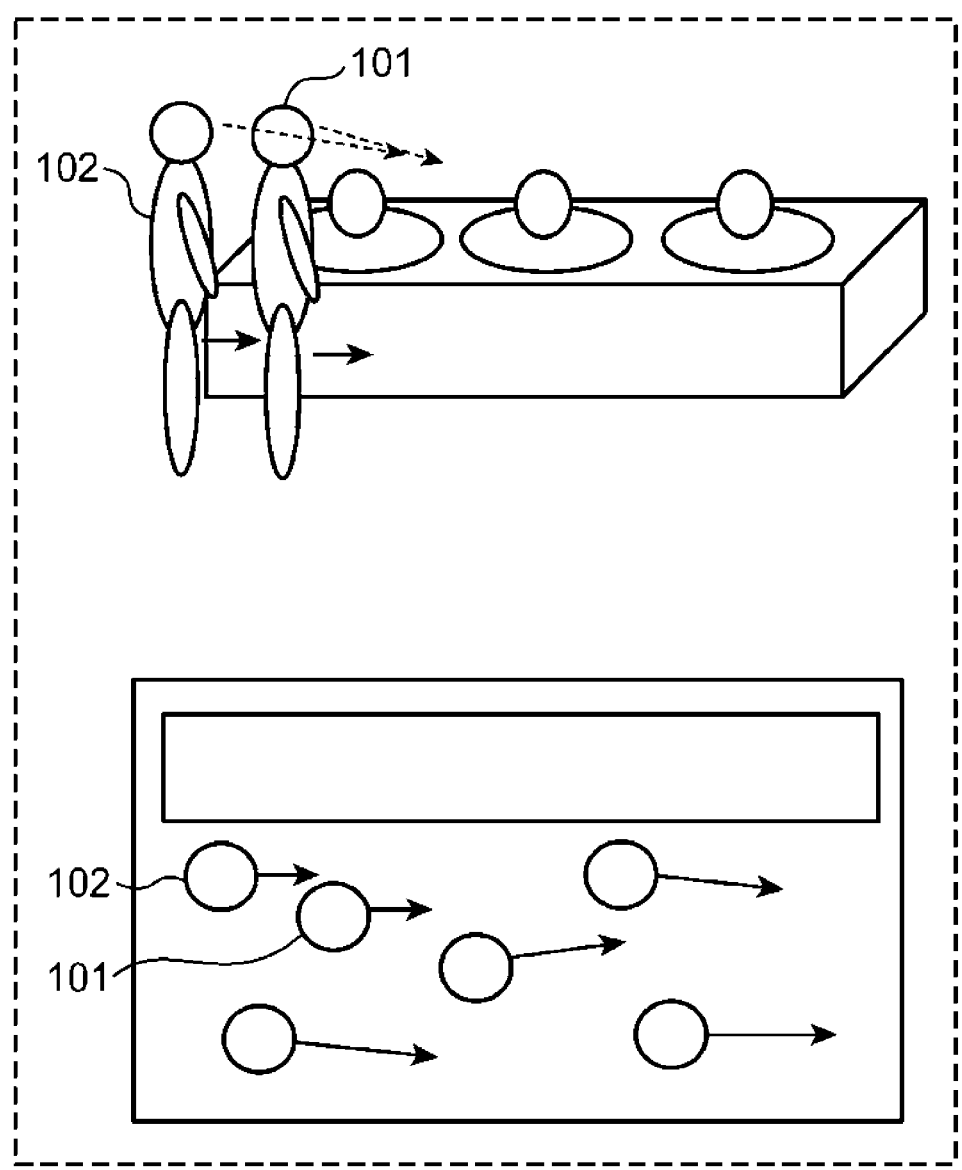
FIG. 17 is a schematic illustration for a process to identify association information of two person nodes that are moving, based on information about their gaze toward a displayed object.

FIG. 16 is a schematic illustration for a process to identify association information of two person nodes that are not moving, based on information about their gaze toward a displayed object. FIG. 17 is a schematic illustration for a process to identify association information of two person nodes that are moving, based on information about their gaze toward a displayed object. In FIGS. 16 and 17, each dashed arrow indicates the direction of gaze of a person, and each solid arrow indicates the direction of travel of a person.

For example, there are situations where, as illustrated in FIGS. 16 and 17, when products are being displayed for passerbys to see, two mutually associated persons talk with each other while directing their gaze toward the same object. Accordingly, as illustrated in FIG. 16, if the first person node 101 and the second person node 102 that have been extracted are directing their gaze toward the same object, the association information identifier 132 may determine that there is an association between the first person node 101 and the second person node 102. The association information identifier 132 may identify association information if at least two persons are directing their gaze toward the same object.

For cases where two person nodes are directing their gaze toward the same object, two highly associated human nodes may sometimes move slowly relative to other person nodes in the surroundings. Accordingly, as illustrated in FIG. 17, the association information identifier 132 may determine that two extracted person nodes have an association with each other if the two extracted person nodes are directing their gaze toward the same object, and if the difference between the mean of the movement speeds of the two extracted person nodes and the mean of the movement speeds of other person nodes in the surroundings is greater than or equal to a predetermined value.

Further, there are situations where, in front of a guide board showing a public map, multiple associated persons check their destination or other information.

Figure 18:
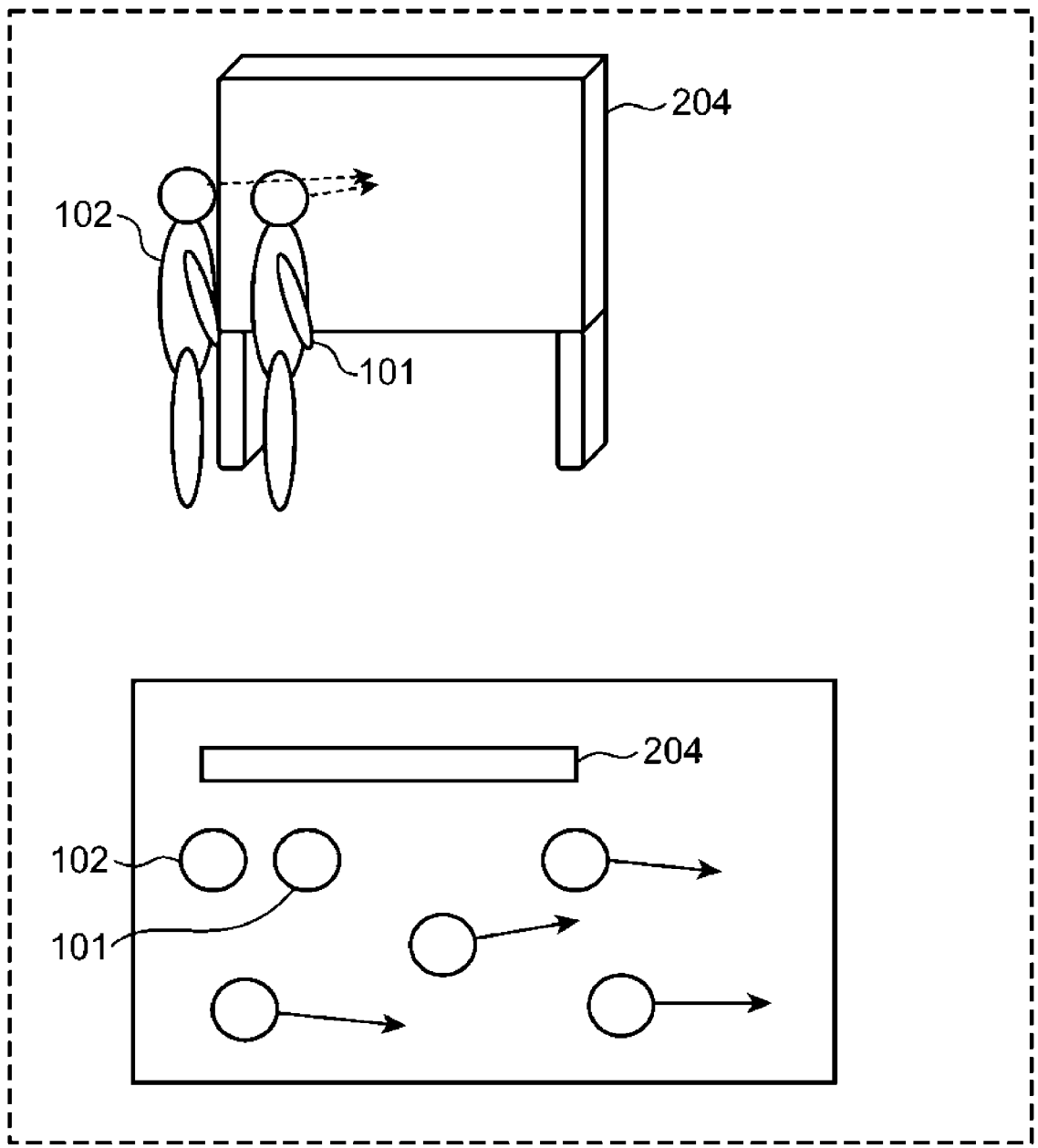
FIG. 18 is a schematic illustration for a process to identify association information of two person nodes based on information about their gaze toward guidance information that provides guidance to people.

FIG. 18 is a schematic illustration for a process to identify association information of two person nodes based on information about their gaze toward guidance information that provides guidance to people. In this case as well, the association information identifier 132 may determine the association between the first person node 101 and the second person node 102 by using information about their gaze toward a guide board 204 that presents guidance information used to provide guidance to people. If two extracted person nodes are directing their gaze toward the guide board 204 such as a map, what the two extracted person nodes have in common is their limited geographical knowledge of the region that the two persons are visiting. Accordingly, the association information identifier 132 may identify association information if at least two persons are directing their gaze toward an object that presents public guidance information. In particular, the association information identifier 132 may identify the association information of two person nodes to be that of tourist group if the two person nodes are directing their gaze toward guidance information.

There may be also situations where two persons are directing their gaze toward a belonging of one of the two persons. Accordingly, the association information identifier 132 may identify the association information of at least two persons by using information about their gaze toward a belonging of one of the at least two persons. The association information identifier 132 may identify association information if at least two persons are directing their gaze toward a belonging of one of the at least two persons.

Figure 19:
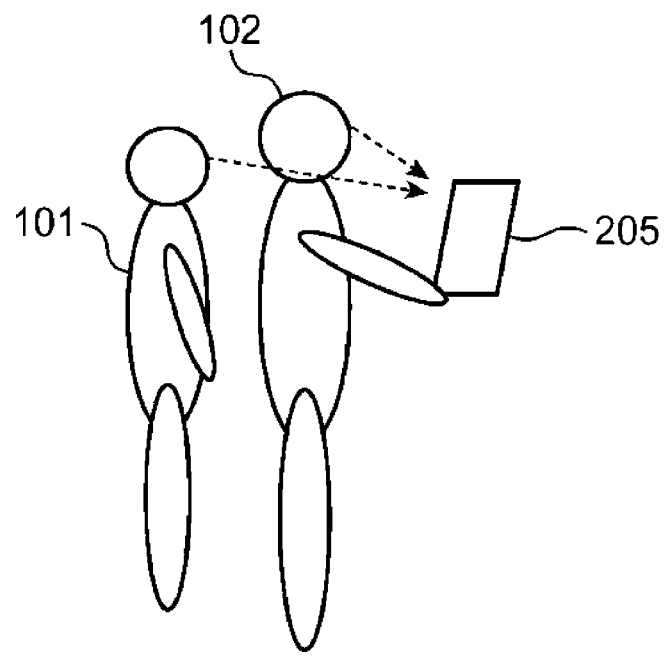
FIG. 19 is a schematic illustration for a process to identify association information of two person nodes based on information about their gaze toward a belonging of one of the two persons.

FIG. 19 is a schematic illustration for a process to identify association information of two person nodes based on information about their gaze toward a belonging of one of the two persons.

For example, if, as illustrated in FIG. 19, both the first person node 101 and the second person node 102 that have been extracted are directing their gaze toward a belonging 205 of the first person node 101, the association information identifier 132 may determine that there is an association between the first person node 101 and the second person node 102 that have been extracted. The belonging 205 is, for example, a terminal apparatus such as a tablet computer or a smart phone. Alternatively, the belonging 205 may be, for example, a map, a brochure, or a guide book.

The direction of gaze of each person can be identified by extracting an image of the person's eyeballs from image information, and using the position of the eyeballs in the image. Since each person is walking in Embodiment 1, it may be difficult to detect the position of eyeballs from image information. In such a case, the orientation of the face of a person may be assumed to coincide with the direction of gaze of the person.

Figure 20:
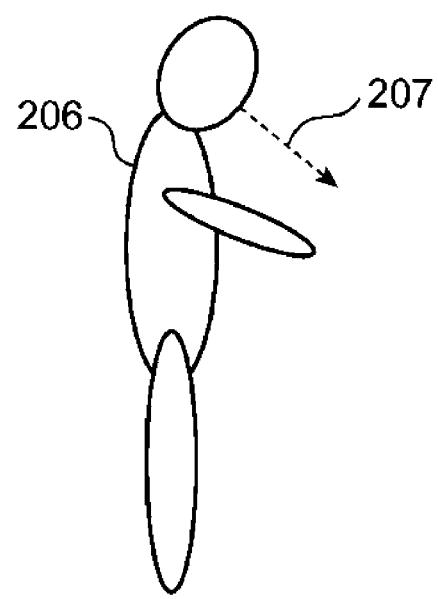
FIG. 20 is a schematic illustration for a process to estimate the gaze direction of a person from the facial orientation of the person.

FIG. 20 is a schematic illustration for a process to estimate the gaze direction of a person from the facial orientation of the person. For example, if a person 206 is looking down as illustrated in FIG. 20, a direction of gaze 207 is also downward. Thus, it is difficult to detect the position of the person's eyeballs from image information. In this case, the second camera 3 may detect the facial orientation of the person node, generate gaze information with the detected facial orientation being assumed to represent gaze direction, and transmit the generated gaze information to the human flow analysis apparatus 1. The communicator 11 of the human flow analysis apparatus 1 may generate gaze information in which the facial orientations of multiple persons detected from the appearance image of each of the multiple persons are assumed to be the gaze directions of the multiple persons.

In Embodiment 1, if the distance between two person nodes becomes less than or equal to a predetermined distance, the node fusion determiner 133 of the human flow analysis apparatus 1 assumes that there is a high association between the two person nodes, and fuses the two nodes into one node. In this case, even after this fusion, the node fusion determiner 133 may calculate the distance between the two person nodes at predetermined intervals of time. The node fusion determiner 133 may undo the fusion if the distance between the two person nodes becomes greater than a predetermined distance after the fusion. That is, after grouping together at least two persons previously determined to be grouped, the node fusion determiner 133 may recalculate the distance between the at least two persons who have been grouped together, and ungroup the at least two persons who have been grouped together if the recalculated distance exceeds a predetermined distance. The node fusion determiner 133 may undo the fusion not only based on the distance between two person nodes but also if a predetermined number of other nodes become present between the two person nodes.

Embodiment 2

In Embodiment 2, the human flow analysis apparatus acquires spatial information about a predetermined space where multiple persons are present, predicts the behavior of a fusion node by using the acquired spatial information, and transmits the prediction result to a terminal apparatus communicatively connected to the human flow analysis apparatus, and the terminal apparatus displays the received prediction result.

Figure 21:
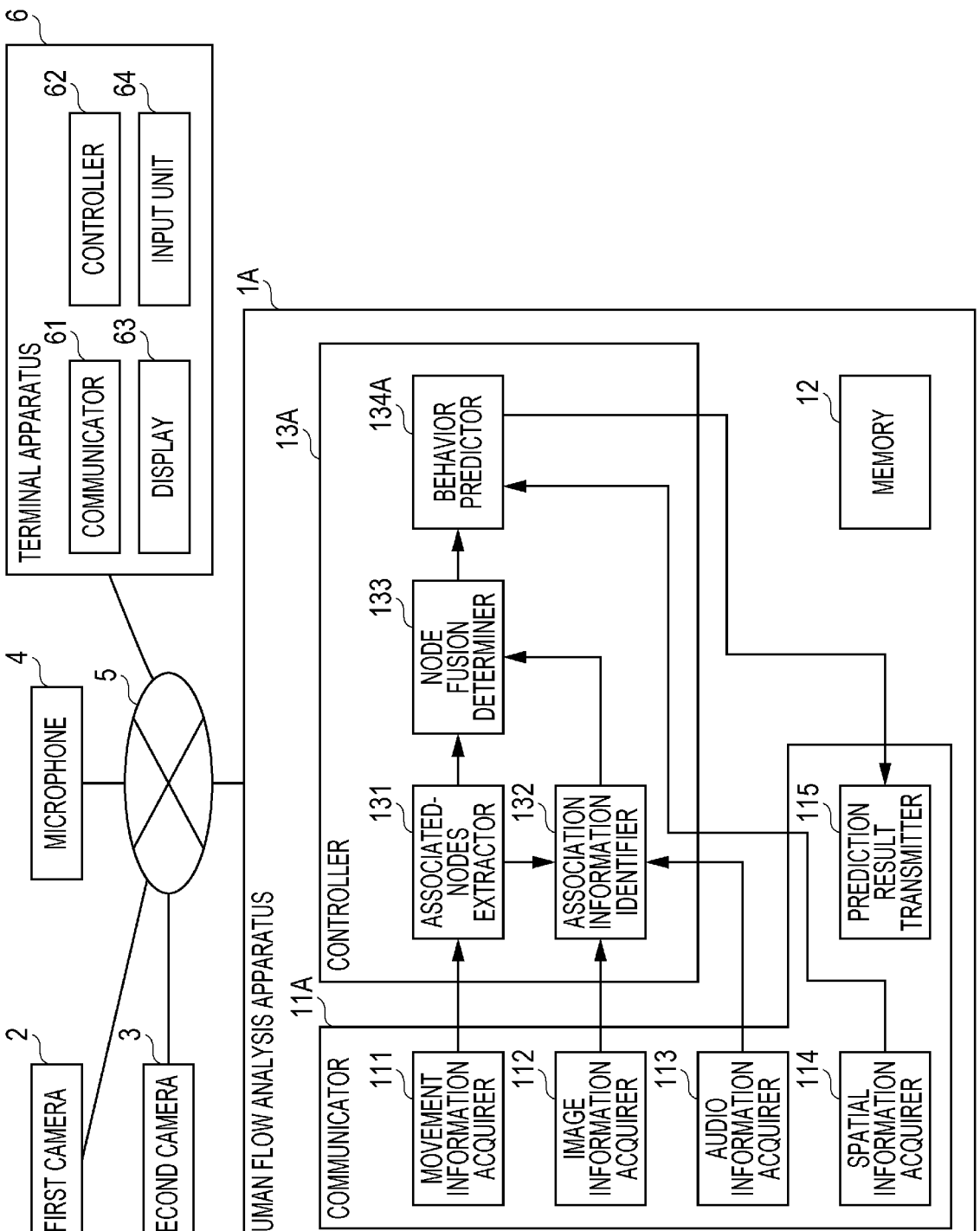
FIG. 21 illustrates the configuration of a human flow analysis system according to Embodiment 2 of the present disclosure.

FIG. 21 illustrates the configuration of a human flow analysis system according to Embodiment 2 of the present disclosure.

A human flow analysis system illustrated in FIG. 21 includes a human flow analysis apparatus 1A, the first camera 2, the second camera 3, the microphone 4, and a terminal apparatus 6. In Embodiment 2, components that are the same as those in Embodiment 1 are denoted by the same reference signs to avoid repetitive description.

The human flow analysis apparatus 1A is connected to the first camera 2, the second camera 3, the microphone 4, and the terminal apparatus 6 via the network 5 in a manner that allows its communication with these components. The network 5 is, for example, the Internet. The human flow analysis apparatus 1A is, for example, a server, and includes a communicator 11A, the memory 12, and a controller 13A.

The communicator 11A includes the movement information acquirer 111, the image information acquirer 112, the audio information acquirer 113, a spatial information acquirer 114, and a prediction result transmitter 115. The communicator 11A may include, for example, a communication circuit serving as a hardware component.

The controller 13A may include, for example, a processor such as a CPU as a hardware component. The controller 13A includes the associated-nodes extractor 131, the association information identifier 132, the node-fusion determiner 133, and a behavior predictor 134A.

The spatial information acquirer 114 acquires spatial information about a predetermined space from an external server. The spatial information acquirer 114 receives the spatial information transmitted by the external server. Spatial information represents, for example, map information. If a predetermined space is a space within a building, spatial information represents the floor plan of the building. Spatial information includes area type information, which represents the type of association information that is associated with an area existing within a predetermined space.

An area that exists within a predetermined space is associated with the type of association information of each group that mainly uses the area. For example, an area representing a toy store is associated with the types of association information of various groups that mainly use the toy store, such as father- and mother-infant group, father- and mother-toddler group, and mother-grade schooler group.

Although the spatial information acquirer 114 transmits acquired spatial information to the behavior predictor 134A in Embodiment 2, the present disclosure is not particularly limited to this arrangement. The spatial information acquirer 114 may store acquired spatial information into the memory 12. In this case, the behavior predictor 134A may read spatial information from the memory 12. Spatial information may be stored into the memory 12 in advance.

The behavior predictor 134A uses the following pieces of information to predict the direction of movement of a fusion node (group node) obtained by grouping at least two person nodes together: the association information of the at least two person nodes, and area type information representing the type of association information that is associated with an area existing within a predetermined space. The behavior predictor 134A predicts, as the destination of a fusion node obtained by grouping at least two person nodes together, an area among multiple areas within a predetermined space that is associated with a type of association information matching the type of association information of the at least two person nodes.

The prediction result transmitter 115 transmits the result of the prediction made by the behavior predictor 134A to the terminal apparatus 6.

The terminal apparatus 6 is, for example, a personal computer, a smart phone, or a tablet computer. The terminal apparatus 6 includes a communicator 61, a controller 62, a display 63, and an input unit 64.

The communicator 61 receives the prediction result transmitted by the human flow analysis apparatus 1A. The communicator 61 may include, for example, a communication circuit serving as a hardware component.

The controller 62 may include, for example, a processor such as a CPU. The controller 62 controls the communicator 61, the display 63, and the input unit 64.

The display 63 is, for example, a liquid crystal display. The display 63 displays the prediction result received by the communicator 61.

The input unit 64 is, for example, a touch panel, a keyboard, or a mouse. The input unit 64 receives an input made by the user.

A process performed by the human flow analysis apparatus according to Embodiment 2 will be described next.

Figure 22:
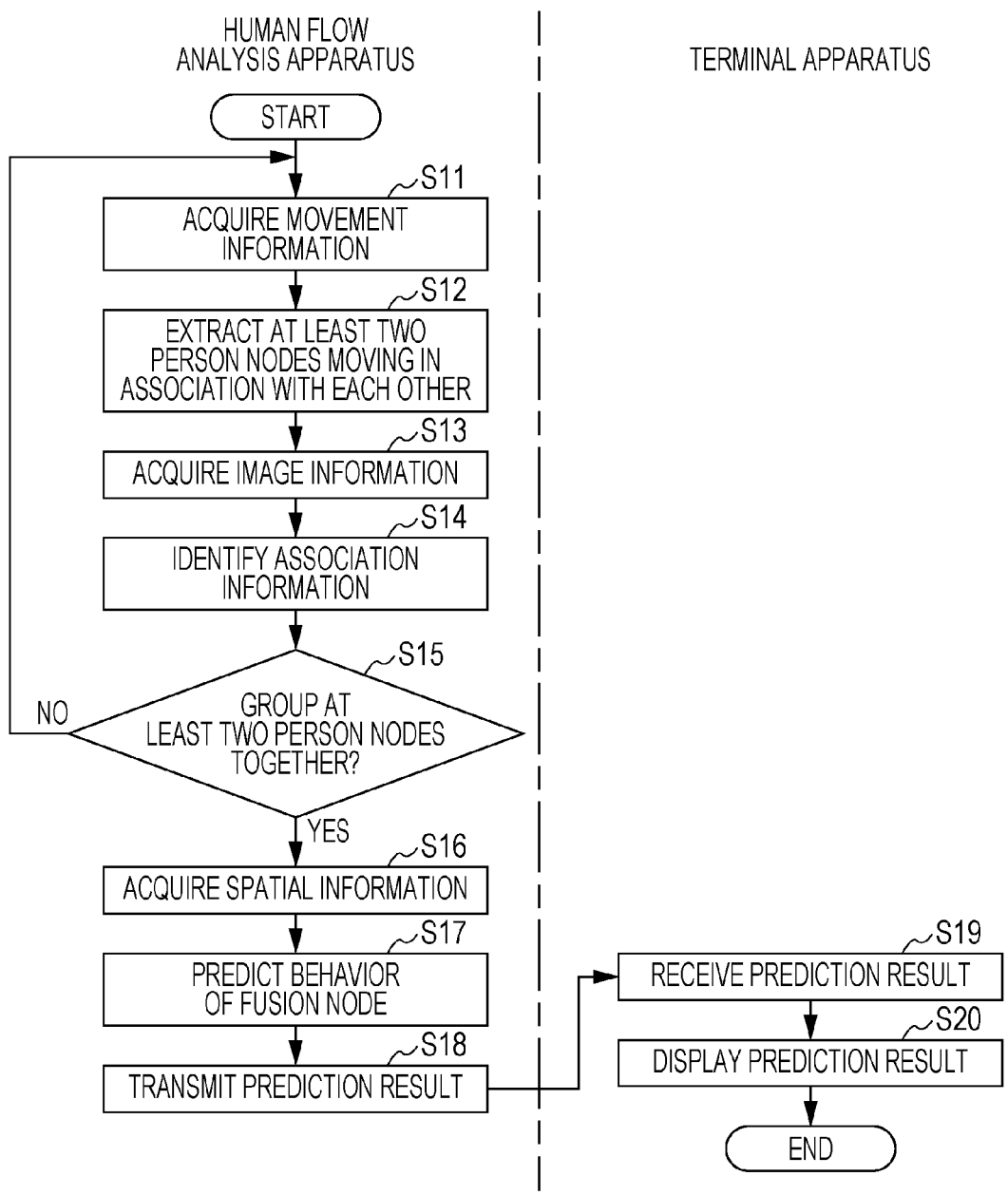
FIG. 22 is a flowchart for a process performed by a human flow analysis apparatus and a terminal apparatus according to Embodiment 2.

FIG. 22 is a flowchart for a process performed by the human flow analysis apparatus and the terminal apparatus according to Embodiment 2. The following description of the flowchart illustrated in FIG. 22 will be directed to a process in which audio information is not acquired but only image information is acquired.

Steps S11 to S15 illustrated in FIG. 22 are the same as steps S1 to S5 illustrated in FIG. 7.

If it is determined to group at least two person nodes together (YES at step S15), the spatial information acquirer 114 acquires, at step S16, spatial information about a predetermined space from an external server.

Next, at step S17, the behavior predictor 134A sets, as one fusion node, at least two person nodes that the node fusion determiner 133 have determined to group together, and the behavior predictor 134A then predicts the behavior of the fusion node. At this time, the behavior predictor 134A uses the following pieces of information to predict the direction of movement of the fusion node (group node) obtained by grouping the at least two person nodes together: the association information of the at least two person nodes, and area type information representing the type of association information that is associated with an area existing within the predetermined space. The behavior predictor 134A predicts, as the destination of the fusion node, an area among multiple areas within the predetermined space that is associated with a type of association information matching the type of association information of the at least two person nodes.

Next, at step S18, the prediction result transmitter 115 transmits the result of the prediction made by the behavior predictor 134A to the terminal apparatus 6.

Next, at step S19, the communicator 61 of the terminal apparatus 6 receives the prediction result transmitted by the human flow analysis apparatus 1A.

Next, at step S20, the display 63 displays the prediction result received by the communicator 61.

Figure 23:
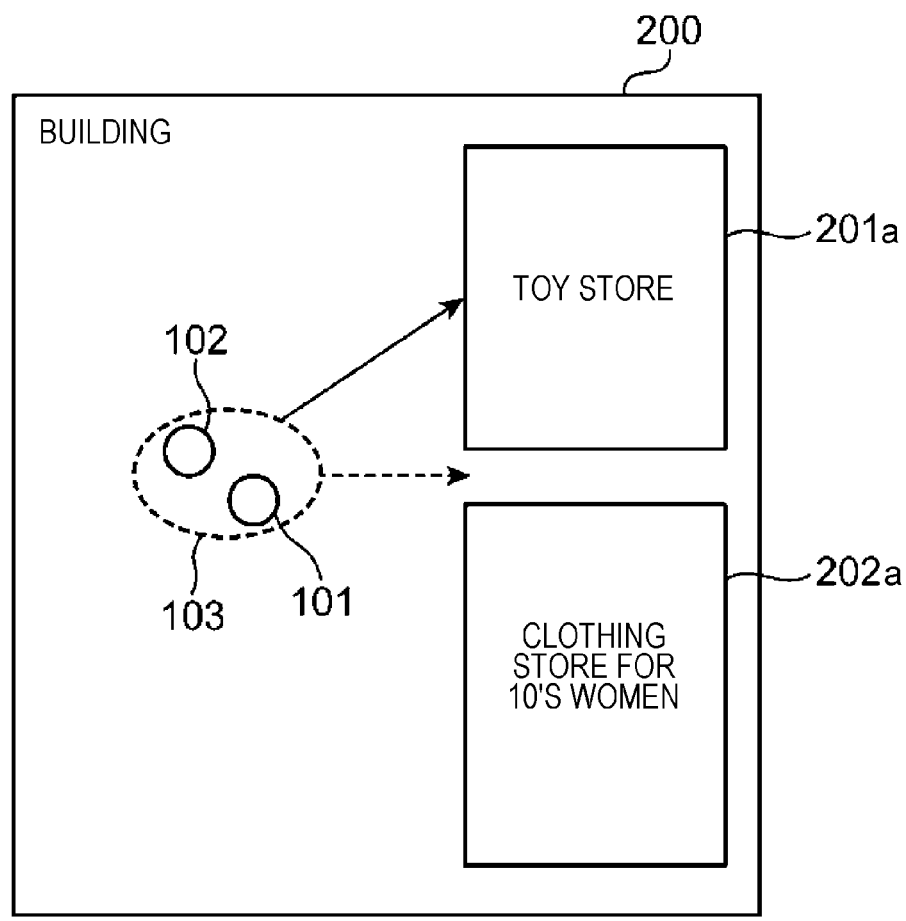
FIG. 23 is a schematic illustration for the result of prediction made by the human flow analysis apparatus according to Embodiment 2.

FIG. 23 is a schematic illustration for the result of prediction made by the human flow analysis apparatus according to Embodiment 2.

In FIG. 23, a predetermined space is a space within a building 200. A toy store 201a, and a clothing store 202a, which is targeted for 10's women, exist within the building 200. The toy store 201a is associated with association information types such as father- and mother-infant group, father- and mother-toddler group, mother-toddler group, and mother-grade schooler group in advance. The clothing store 202a is associated with an association information type representing 10's female friend group.

The first person node 101 illustrated in FIG. 23 represents a mother, the second person node 102 represents a toddler, and the fusion node 103, which is obtained by grouping the first person node 101 and the second person node 102 together, is associated with the association information "mother-toddler group".

If the movement vector of the fusion node 103, which is created by combining the movement vector of the first person node 101 and the movement vector of the second person node 102, is indicated by a dashed arrow in FIG. 23, it is not possible for the behavior predictor 134A to predict which one of the toy store 201a and the clothing store 202a the fusion node 103 will move toward.

In this case, of the toy store 201a and the clothing store 202a that exist within the building 200, it is the toy store 201a that is associated with a type of association information matching the type of association information (mother-toddler group) of the fusion node 103. Accordingly, the behavior predictor 134A predicts the toy store 201a as the destination to which the fusion node 103 will move next.

As illustrated in FIG. 23, the behavior predictor 134A may generate a prediction result image with an added arrow that extends from the fusion node 103 to the toy store 201a, which is the predicted destination. The prediction result transmitter 115 may transmit the prediction result image illustrated in FIG. 23 to the terminal apparatus 6. The display 63 of the terminal apparatus 6 may display the prediction result image illustrated in FIG. 23.

The behavior predictor 134A may generate a movement trajectory image representing the trajectory of movement of a fusion node within a predetermined space, and transmits the generated movement trajectory image to the terminal apparatus 6.

Figure 24:
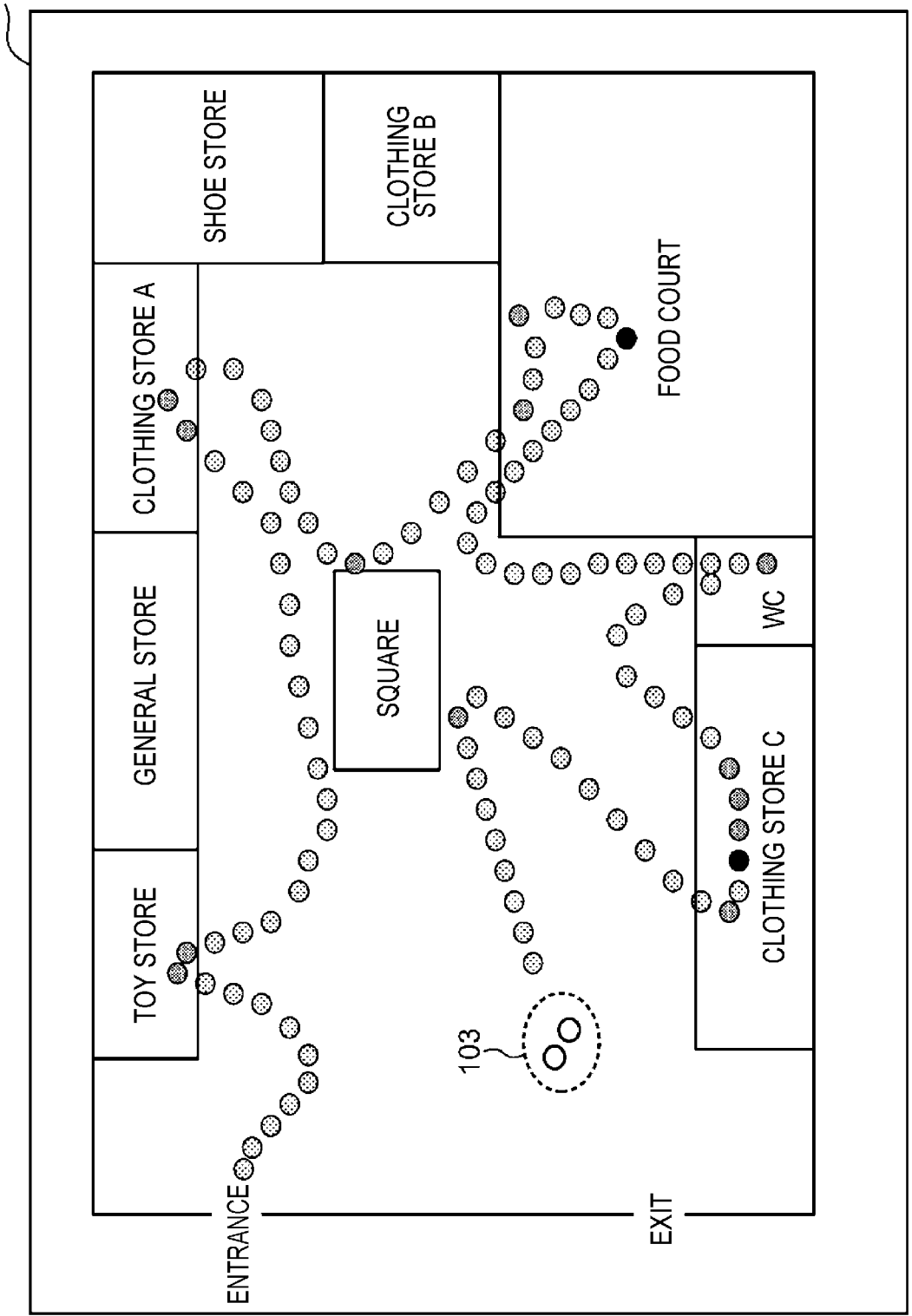
FIG. 24 illustrates an exemplary movement trajectory image generated by the human flow analysis apparatus according to Embodiment 2.

FIG. 24 illustrates an exemplary movement trajectory image generated by the human flow analysis apparatus according to Embodiment 2.

The display 63 of the terminal apparatus 6 displays each fusion node on the floor plan of a building. The input unit 64 receives a user's selection of a fusion node whose trajectory (line) of movement within the building is to be displayed. The communicator 61 transmits information for identifying the selected fusion node to the human flow analysis apparatus 1A. The communicator 11A of the human flow analysis apparatus 1A receives the information for identifying the fusion node transmitted by the terminal apparatus 6. Then, the behavior predictor 134A references movement information, and generates a movement trajectory image in which the trajectory (line) of movement of the fusion node selected by the user is superimposed on the building's floor plan. The communicator 11A transmits the movement trajectory image generated by the behavior predictor 134A to the terminal apparatus 6. The communicator 61 of the terminal apparatus 6 receives the movement trajectory image transmitted by the human flow analysis apparatus 1A. The display 63 displays the movement trajectory image received by the communicator 61.

In the movement trajectory image illustrated in FIG. 24, the trajectory of movement of the fusion node 103 is superimposed on the building's floor plan. The fusion node 103 is associated with the association information "mother-toddler group". The trajectory of movement of the fusion node 103 is represented by dots, and the length of time spent in each store is represented by the lightness/darkness of the color of each dot. That is, the longer the time spent in each store, the darker the color in which the corresponding dot is displayed. Alternatively, the trajectory of movement of the fusion node 103 may be represented by line segments, and the thickness or color of each line segment may be made to vary with the length of time spent. The time spent in each store may be displayed on the building's floor plan. Rather than displaying the trajectory of movement of a single fusion node, the display 63 may display the trajectories of movement of multiple fusion nodes.

In each of the above-mentioned embodiments, each component may be either implemented by dedicated hardware, or implemented by executing a software program suited for the component. Each component may be implemented by a program executor such as a CPU or processor reading and executing a software program stored in a storage medium such as a hard disk or a semiconductor memory.

Some or all of the functions of the apparatus according to each of the embodiments of the present disclosure are typically implemented as large scale integrations (LSIs), which are integrated circuits. These LSIs may each be individually formed as a single chip, or may be integrated into a single chip to include some or all of the functions. Further, circuit integration may not necessarily be implemented by LSI but may be implemented by use of dedicated circuitry or a general-purpose processor. A field programmable gate array (FPGA), which is programmable after fabrication of the LSI, or a reconfigurable processor, which allows reconfiguration of the connections and settings of circuit cells in the LSI, may be used.

Further, some or all of the functions of the apparatus according to each of the embodiments of the present disclosure may be each implemented by a processor such as a CPU executing a program.

The human flow analysis method, the human flow analysis apparatus, and the human flow analysis system according to the present disclosure make it possible to predict the line of movement of each person with improved accuracy, and are useful when used as a human flow analysis method, a human flow analysis apparatus, and a human flow analysis system that analyze the flow of multiple persons moving within a predetermined space.

What is claimed is:

1. A human flow analysis method performed by a processor of a human flow analysis apparatus, the human flow analysis method comprising:
    acquiring movement information, the movement information representing a history of movement within a predetermined space by a plurality of persons moving within the predetermined space;
    extracting, based on the acquired movement information, at least two persons moving while keeping a distance from each other less than or equal to a predetermined distance for a predetermined period of time, wherein the two persons are extracted from the plurality of persons;
    identifying, based on the acquired movement information, a positional relationship between the extracted two persons with respect to a direction of travel of the extracted two persons;
    identifying an association which the extracted at least two persons have with each other by using the identified positional relationship between the extracted two persons with respect to the direction of travel of the extracted two persons;
    determining, based on the identified association, whether to group the extracted at least two persons together; and
    predicting a behavior of the extracted at least two persons who have been determined to be grouped together.

2. The human flow analysis method according to claim 1, wherein the extracting includes calculating, for all combinations of two persons included in the plurality of persons, a distance between the two persons, and extracting, as the at least two persons, each of all combinations of two persons corresponding to a distance less than a predetermined threshold among all calculated distances.

3. The human flow analysis method according to claim 1, wherein, when an angle formed between a straight line connecting top parts of heads of the extracted two persons, and the direction of travel of the extracted two persons is within a predetermined range centered at 90 degrees, the identifying of the association identifies that the extracted two persons have an association with each other that represents friends, a couple, or a family.

4. The human flow analysis method according to claim 1, wherein, when an angle formed between a straight line connecting top parts of heads of the extracted two persons, and the direction of travel of the extracted two persons is less than or equal to a predetermined angle, the identifying of the association identifies that the extracted two persons have an association with each other that represents a person in wheelchair and a caregiver.

5. The human flow analysis method according to claim 1, wherein the extracting extracts the two persons among the plurality of persons, who have successively passed through a gate, the gate allowing a predetermined number of persons to pass through the gate at a time.

6. A human flow analysis method performed by a processor of a human flow analysis apparatus, the human flow analysis method comprising:
    acquiring movement information, the movement information representing a history of movement within a predetermined space by a plurality of persons moving within the predetermined space;
    acquiring an appearance image of the plurality of persons;
    extracting, based on the acquired movement information, at least two persons moving while keeping a distance from each other less than or equal to a predetermined distance for a predetermined period of time, wherein the at least two persons are extracted from the plurality of persons;
    discriminating respective ages and sexes of the extracted at least two persons from respective facial images of the extracted at least two persons included in the acquired appearance image;
    identifying an association which the extracted at least two persons have with each other, by using the respective ages and sexes of the extracted at least two persons that have been discriminated;
    determining, based on the identified association, whether to group the extracted at least two persons together; and
    predicting a behavior of the extracted at least two persons who have been determined to be grouped together.

7. The human flow analysis method according to claim 1, further comprising
    acquiring gaze information, the gaze information representing gaze directions of the plurality of persons,
    wherein the identifying identifies the association by using the gaze directions of the at least two persons included in the acquired gaze information.

8. The human flow analysis method according to claim 7, wherein the identifying identifies the association when the gaze directions of the extracted two persons point toward an identical object.

9. The human flow analysis method according to claim 8, wherein the identical object comprises a belonging of one of the extracted two persons.

10. The human flow analysis method according to claim 8, wherein the identical object comprises a physical object that presents public guidance information.

11. The human flow analysis method according to claim 7,
wherein the acquiring of the gaze information includes acquiring the gaze information in which facial orientations of the plurality of persons detected from an appearance image of the plurality of persons are assumed to be the gaze directions of the plurality of persons.

12. The human flow analysis method according to claim 1, further comprising
acquiring audio information of speech uttered by each of the plurality of persons,
wherein the identifying identifies the association by using, among the acquired audio information, the audio information of the extracted two persons having a conversation.

13. The human flow analysis method according to claim 12,
wherein the identifying identifies the association by extracting, from the audio information of the extracted two persons having a conversation, a proper noun, or a keyword that identifies kinship.

14. The human flow analysis method according to claim 1,
wherein the predicting includes predicting a direction of movement on a group-by-group basis for each grouping of the extracted two persons, by using the identified association of the extracted two persons and the movement information of the extracted two persons.

15. The human flow analysis method according to claim 1,
wherein the predicting includes predicting a direction of movement on a group-by-group basis for each grouping of the extracted two persons, by using the identified association of the extracted two persons and area type information, the area type information representing a type of association that is associated with an area existing within the predetermined space.

16. The human flow analysis method according to claim 1, further comprising
recalculating a distance between the extracted two persons previously determined to be grouped together after the extracted two persons are grouped together, and ungrouping the extracted two persons who have been grouped together when the recalculated distance exceeds a predetermined distance.

17. A human flow analysis apparatus comprising:
a processor; and
a memory that stores a program which causes the processor to execute:
acquiring movement information, the movement information representing a history of movement within a predetermined space by a plurality of persons moving within the predetermined space;
extracting, based on the acquired movement information, two persons moving while keeping a distance from each other less than or equal to a predetermined distance for a predetermined period of time, wherein the two persons are extracted from the plurality of persons;
identifying, based on the acquired movement information, a positional relationship between the extracted two persons with respect to a direction of travel of the extracted two persons;
identifying an association which the extracted two persons have with each other, by using the identified positional relationship between the extracted two persons with respect to the direction of travel of the extracted two persons;
determining, based on the identified association, whether to group the extracted two persons together; and
predicting a behavior of the extracted two persons who have been determined to be grouped together.

18. A human flow analysis system comprising:
a human flow analysis apparatus; and
a terminal apparatus communicatively connected to the human flow analysis apparatus via a network,
wherein the human flow analysis apparatus includes:
a processor;
a memory that stores a program which causes the processor to execute:
acquiring movement information, the movement information representing a history of movement within a predetermined space by a plurality of persons moving within the predetermined space,
extracting, based on the acquired movement information, two persons moving while keeping a distance from each other less than or equal to a predetermined distance for a predetermined period of time, wherein the two persons are extracted from the plurality of persons,
identifying, based on the acquired movement information, a positional relationship between the extracted two persons with respect to a direction of travel of the extracted two persons;
identifying an association which the extracted two persons have with each other, by using the identified positional relationship between the extracted two persons with respect to the direction of travel of the extracted two persons,
determining, based on the identified association, whether to group the extracted two persons together,
predicting a behavior of the extracted two persons who have been determined to be grouped together; and
a transmitter that transmits a behavior prediction result to the terminal apparatus, the behavior prediction result representing the predicted behavior of the extracted two persons, and
wherein the terminal apparatus includes:
a receiver that receives the behavior prediction result transmitted from the transmitter of the human flow analysis apparatus, and
a display that displays the received behavior prediction.

19. A human flow analysis apparatus comprising:
a processor; and
a memory that stores a program which causes the processor to execute:
acquiring movement information, the movement information representing a history of movement within a predetermined space by a plurality of persons moving within the predetermined space;
acquiring an appearance image of the plurality of persons;
extracting, based on the acquired movement information, at least two persons moving while keeping a distance from each other less than or equal to a predetermined distance for a predetermined period of time, wherein the at least two persons are extracted from the plurality of persons;
discriminating respective ages and sexes of the extracted at least two persons from respective facial images of the extracted at least two persons included in the acquired appearance image;

identifying an association which the extracted at least two persons have with each other, by using the respective ages and sexes of the extracted at least two persons that have been discriminated;

determining, based on the identified association, whether to group the extracted at least two persons together; and predicting a behavior of the extracted at least two persons who have been determined to be grouped together.

20. A human flow analysis system comprising:
a human flow analysis apparatus; and
a terminal apparatus communicatively connected to the human flow analysis apparatus via a network,
wherein the human flow analysis apparatus includes:
a processor;
a memory that stores a program which causes the processor to execute:
  acquiring movement information, the movement information representing a history of movement within a predetermined space by a plurality of persons moving within the predetermined space,
  acquiring an appearance image of the plurality of persons;
  extracting, based on the acquired movement information, at least two persons moving while keeping a distance from each other less than or equal to a predetermined distance for a predetermined period of time, wherein the at least two persons are extracted from the plurality of persons,
  discriminating respective ages and sexes of the extracted at least two persons from respective facial images of the extracted at least two persons included in the acquired appearance image,
  identifying an association which the extracted at least two persons have with each other, by using the respective ages and sexes of the extracted at least two persons that have been discriminated,
  determining, based on the identified association, whether to group the extracted at least two persons together, and
  predicting a behavior of the extracted at least two persons who have been determined to be grouped together; and
a transmitter that transmits a behavior prediction result to the terminal apparatus, the behavior prediction result representing the predicted behavior of the extracted at least two persons, and
wherein the terminal apparatus includes:
  a receiver that receives the behavior prediction result transmitted from the transmitter of the human flow analysis apparatus, and
  a display that displays the received behavior prediction.

* * * * *